United States Patent
Sezaki et al.

(10) Patent No.: US 10,733,554 B2
(45) Date of Patent: Aug. 4, 2020

(54) INFORMATION PROCESSING APPARATUS AND METHOD FOR MANAGING CONNECTIONS

(71) Applicant: FUJITSU LIMITED, Kawasaki-shi, Kanagawa (JP)

(72) Inventors: Yasuo Sezaki, Akashi (JP); Yuko Matsushita, Kobe (JP); Tsuyoshi Honma, Nagoya (JP); Toshiyuki Utsumi, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 495 days.

(21) Appl. No.: 15/413,559

(22) Filed: Jan. 24, 2017

(65) Prior Publication Data

US 2017/0236085 A1 Aug. 17, 2017

(30) Foreign Application Priority Data

Feb. 12, 2016 (JP) .................................. 2016-024367

(51) Int. Cl.
*G06Q 10/06* (2012.01)
*G06Q 10/10* (2012.01)

(52) U.S. Cl.
CPC ..... *G06Q 10/06316* (2013.01); *G06Q 10/103* (2013.01)

(58) Field of Classification Search
None
See application file for complete search history.

(56) References Cited

U.S. PATENT DOCUMENTS

| 7,346,532 B2 | 3/2008 | Kusama et al. |
| 9,176,791 B2 | 11/2015 | Furukawa et al. |
| 2001/0018701 A1* | 8/2001 | LiVecchi ............... G06F 9/4881 718/105 |
| 2006/0282302 A1* | 12/2006 | Hussain ................. G06Q 10/06 705/2 |

(Continued)

FOREIGN PATENT DOCUMENTS

| JP | 2008-135054 | 6/2008 |
| JP | 2014-6740 | 1/2014 |
| KR | 100326990 B1 * | 3/2002 ........... G06F 9/4881 |

OTHER PUBLICATIONS

Iliadis, I. "A New Feedback Congestion Control Policy for Long Propagation Delays." IEEE Journal on Selected Areas in Communications, vol. 13, No. 7, Sep. 1, 1995, pp. 1284-1295., doi:10.1109/49.414646. (Year: 1995).*

*Primary Examiner* — Amanda Gurski
*Assistant Examiner* — Tiera J Fletcher
(74) *Attorney, Agent, or Firm* — Fujitsu Patent Center

(57) ABSTRACT

An information processing apparatus determines human task counts each representing a number of human tasks in individual workflows. Each workflow defines a procedure of tasks to be performed on a device under management, where the tasks include human tasks to be performed by humans and automated tasks to be executed automatically with remote control via a network. The information processing apparatus then determines priorities of the workflows, based on the human task counts determined therefor, for prioritized use of a connection that is established to communicate with the device under management in order to perform automated tasks thereon.

8 Claims, 35 Drawing Sheets

(56) References Cited

U.S. PATENT DOCUMENTS

| | | | | |
|---|---|---|---|---|
| 2008/0120153 A1* | 5/2008 | Nonemacher | ............ | G06F 8/10 |
| | | | | 705/7.26 |
| 2010/0306005 A1* | 12/2010 | Yengulalp | ............. | G06Q 10/06 |
| | | | | 705/7.27 |
| 2013/0198373 A1* | 8/2013 | Zalmanovitch | ..... | H04M 15/854 |
| | | | | 709/224 |

* cited by examiner

FIG. 9

162 QUEUE DATA STORAGE UNIT

162a COMMUNICATION REQUEST MANAGEMENT TABLE

| TARGET DEVICE ID | PRIORITY | | | | START DATE AND TIME | REQUESTER INFORMATION | REQUESTED TASK INFORMATION |
|---|---|---|---|---|---|---|---|
| | SIGNIFI-CANCE | TARGET COMPLETION DATE AND TIME | REMAINING HUMAN TASK COUNT | | | | |
| K0001 | HIGH | 2015/10/10 13:00:00 | 1 | | 2015/10/10 12:00:00 | WF0001 | useradd XXX |
| K0001 | MIDDLE | 2015/10/10 13:00:00 | 3 | | 2015/10/10 09:30:00 | WF0003 | userdelete XXX |
| K0001 | MIDDLE | 2015/10/10 13:00:00 | 0 | | 2015/10/10 09:00:00 | WF0002 | XXX YYY |
| ... | ... | ... | ... | | ... | ... | ... |

FIG. 20

| TAG NAME | ELEMENT |
| --- | --- |
| Activity | My ID |
| | My Name |
| Performer | Activity type |
| | "Role" in the case of human activity |
| TransitionRestrictions | |
| TransitionRestriction | |
| TransitionRefs | |
| TransitionRef | Destination ID |

FIG. 21

| TAG NAME | ELEMENT |
|---|---|
| Transition | Source ID |
| | My ID |
| | My Name |
| | Destination ID |

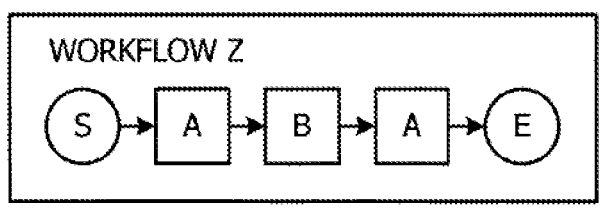
FIG. 34
Without consideration of workflow's structure
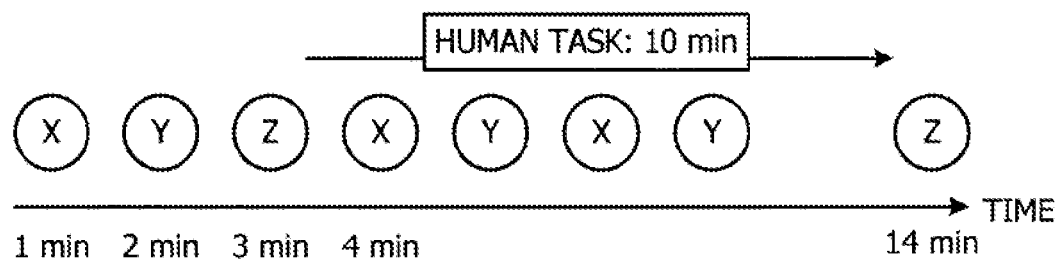
With consideration of workflow's structure
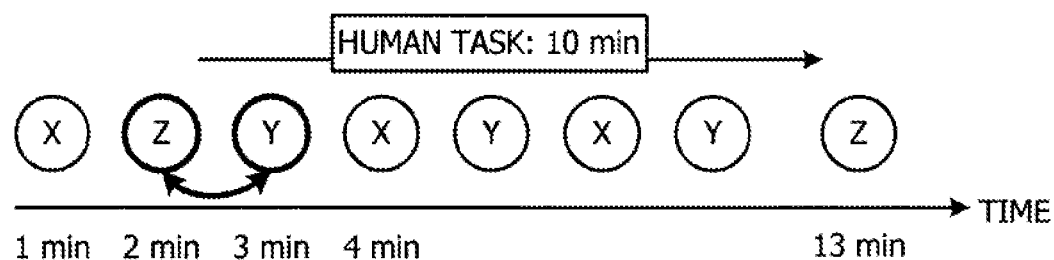

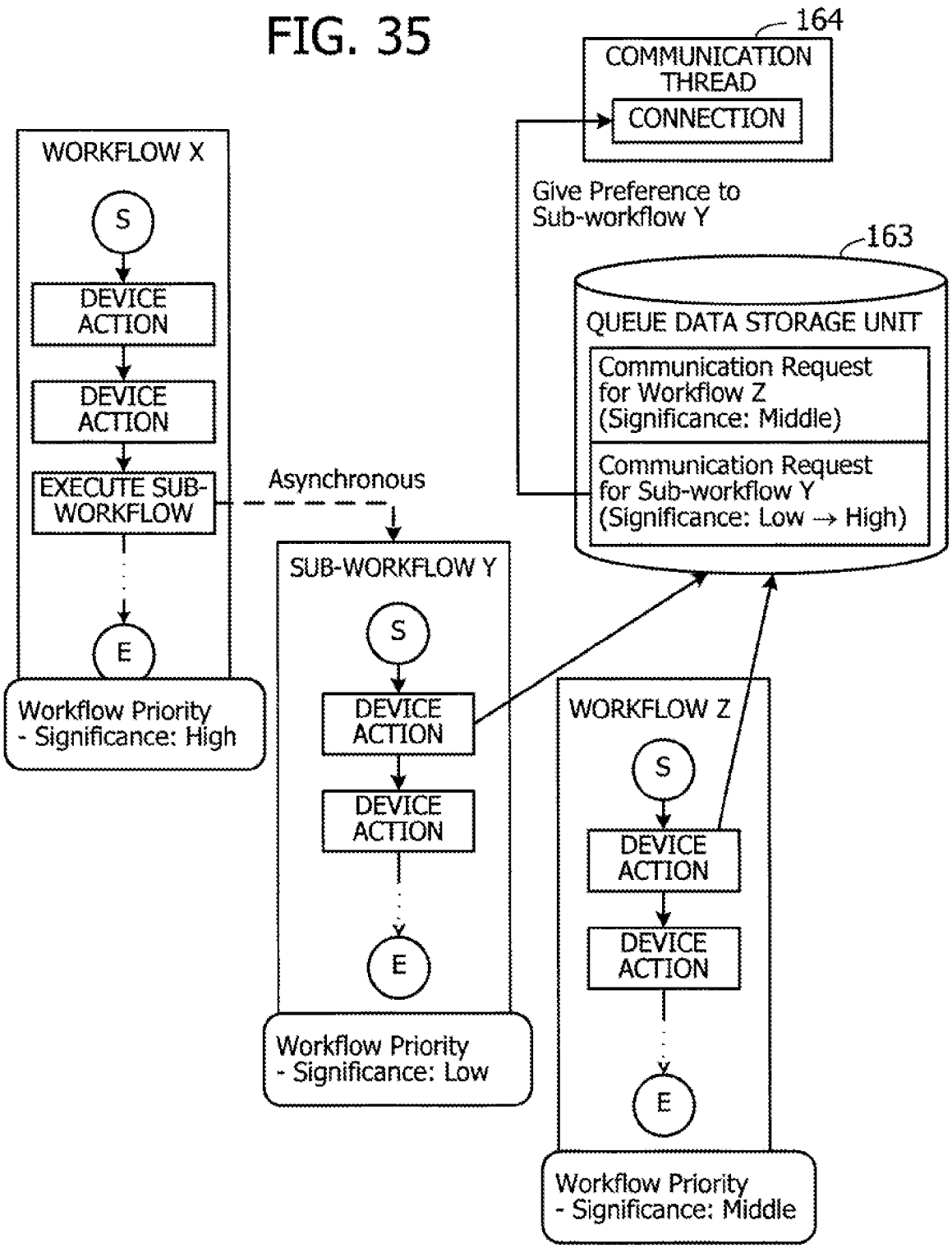

INFORMATION PROCESSING APPARATUS AND METHOD FOR MANAGING CONNECTIONS

CROSS-REFERENCE TO RELATED APPLICATION

This application is based upon and claims the benefit of priority of the prior Japanese Patent Application No. 2016-024367, filed on Feb. 12, 2016, the entire contents of which are incorporated herein by reference.

FIELD

The embodiments discussed herein relate to an information processing apparatus and a method for managing connections.

BACKGROUND

A series of tasks for operations management of a computer system may be executed automatically by using a workflow. For example, a workflow execution server is employed to perform tasks on managed target devices through remote control via a network, according to a workflow that defines a task procedure.

Such workflow-based automated execution of business tasks is applied to a growing area in the field of operations management, and there are increasing cases of concurrent execution of multiple workflows. When workflows run in parallel, two or more tasks may be directed to a single target device at the same time. In this case, the workflow execution server may set up multiple connections to the target device and use these connections to execute multiple tasks in parallel according to the workflows.

As an example of techniques about workflows, there is proposed an exclusive control method that dynamically determines exclusive sections in individual workflows to indicate where an exclusive lock is to take place. See, for example, the following document:
Japanese Laid-open Patent Publication No. 2014-006740

SUMMARY

In one aspect of the embodiments discussed herein, there is provided a non-transitory computer-readable storage medium storing a program, wherein the program causes a computer to perform a process including: determining human task counts each representing a number of human tasks in individual workflows, the workflows each defining a procedure including tasks performed on a device under management, the tasks including human tasks to be performed by humans and automated tasks to be executed automatically with remote control via a network; and determining priorities of the workflows, based on the human task counts determined therefor, for prioritized use of a connection that is established to communicate with the device under management in order to perform automated tasks thereon.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 illustrates an example of a queue data storage unit;
FIG. 20 illustrates an example of information in Activities tags;
FIG. 21 illustrates an example of information in Transitions tags.

FIG. 34 illustrates difference processing times of workflows, depending on whether to consider remaining human task counts; and FIG. 35 illustrates priority control of sub-workflows.

DESCRIPTION OF EMBODIMENTS

Suppose now that multiple workflows are executed concurrently, in which some actions may be concentrated into a particular target device within a particular time frame. The number of tasks causing such actions may sometimes exceed the maximum allowable number of connections from the workflow execution server to the target device. Since available connections are limited, the tasks in workflows are executed in descending order of their priorities. The priorities of tasks are determined from, for example, significance of their source workflows. Vacant connections are assigned to the tasks in descending order of priorities of the workflows, so that their device actions will take place via the assigned connections.

Conventional priority determination methods, however, do not take into consideration whether the workflows includes human tasks, thus being unable to provide a satisfactory solution for efficient workflow control. For example, in the case of a workflow including a human task, some task located before the human task may be forced to wait for assignment of a connection when the number of connections has reached its upper limit. This waiting time would delay the start of the human task and consequently prolong the completion of the workflow.

Several embodiments will be described below with reference to the accompanying drawings. These embodiments may be combined with each other unless they have contradictory features.

(A) First Embodiment

Figure 1:
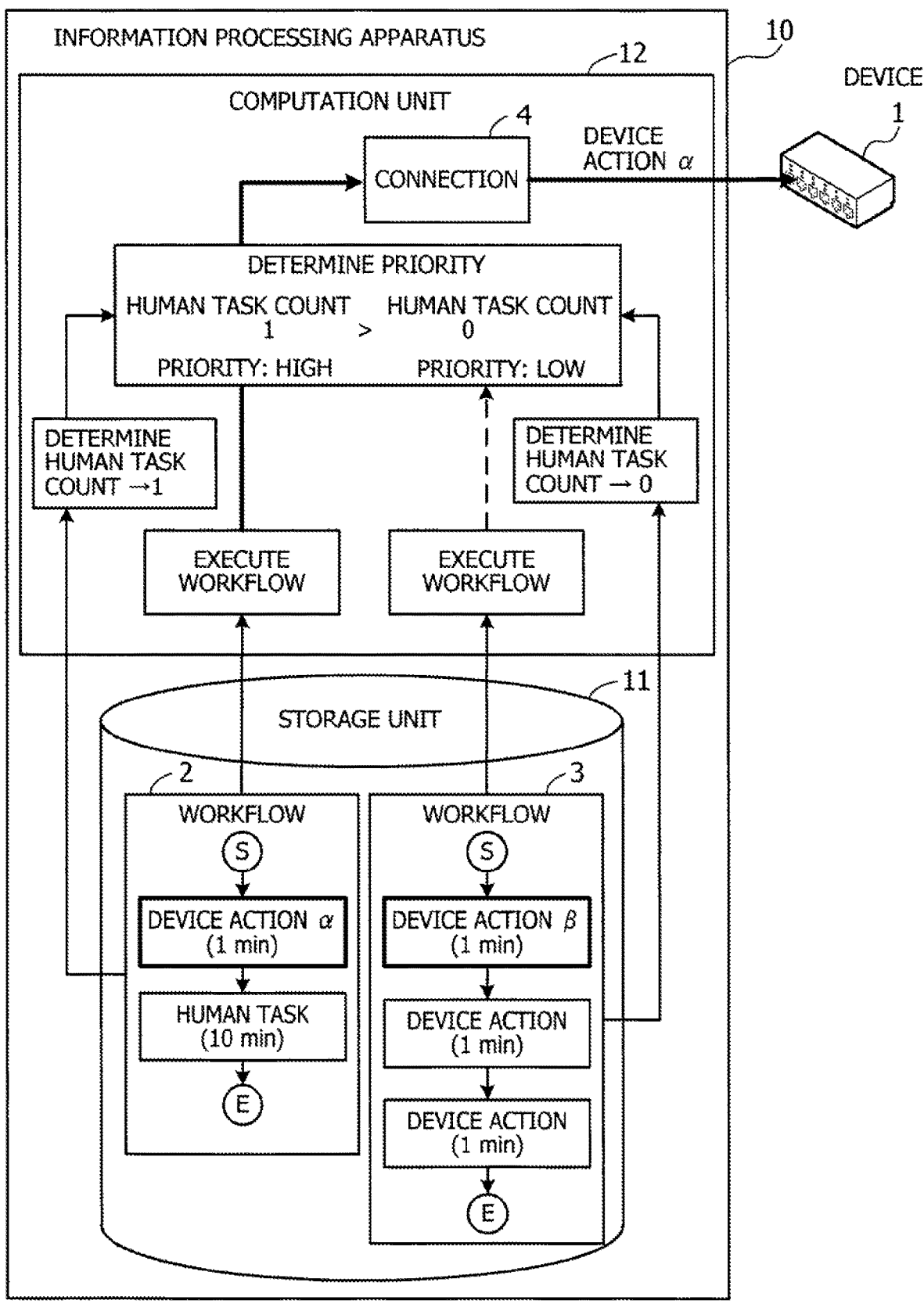
FIG. 1 illustrates an example of an information processing apparatus according to a first embodiment.

FIG. 1 illustrates an example of an information processing apparatus according to a first embodiment. This information processing apparatus 10 includes a storage unit 11 and a computation unit 12.

The storage unit 11 stores therein a plurality of workflows 2 and 3 (referred to as the first workflow 2 and the second workflow 3, as needed). Each of the workflows 2 and 3 defines a procedure of tasks on a specific target device 1, the tasks including human tasks to be performed by humans, or automated tasks to be executed automatically with remote control via a network, or both of human tasks and automated tasks.

The computation unit 12 executes tasks according to procedures indicated in the individual workflows 2 and 3. As noted above, the workflows 2 and 3 include automated tasks, which are supposed to be executed automatically. The computation unit 12 executes such tasks by itself. Some other tasks are executed by humans, during which the computation unit 12 waits for their completion. Upon receipt of an input that indicates completion of a human task, the computation unit 12 recognizes the completion and thus advances the workflow to the next task.

The computation unit 12 also determines a human task count (i.e., the number of human tasks) in each of the workflows 2 and 3, when executing an automatically executable task in the workflows 2 and 3. For example, the computation unit 12 counts unexecuted human tasks in each of the workflows 2 and 3.

The computation unit 12 further establishes a connection 4 to the device 1 in order to perform a task (device action) in an automated way via remote control. With respect to each of the workflows 2 and 3, the computation unit 12 determines a priority for using the established connection 4 to the device 1. For example, the computation unit 12 gives a higher priority to workflows having more human tasks.

Referring to the example of FIG. 1, the first workflow 2 includes device action α as its first task, while the second workflow 3 includes device action β as its first task. Both of these tasks are automated tasks. Suppose now that the two device actions α and β are simultaneously initiated. At this moment, the first workflow 2 has one unexecuted human task, whereas the second workflow 3 has no human tasks. Accordingly, the computation unit 12 gives a higher priority to the first workflow 2 than the second workflow 3 when performing their tasks. In other words, the computation unit 12 uses the connection 4 for performing the first workflow 2 in preference to the second workflow 3. As a result, device action α is executed on the device 1 via the connection 4, and then device action β follows.

The techniques described above make it possible to perform a workflow having many unexecuted human tasks in preference to others. Human tasks take more time than automatically executable tasks. The raised priority promotes an earlier start of a time-consuming human task, meaning that the noted workflow will be finished in a shorter time.

For example, human tasks may each take ten times as long execution time as a device action. The example of FIG. 1 assumes that each device action takes one minute, whereas each human task takes ten minutes. In this case, the priority given to device action α makes it possible to perform the first workflow 2 without delay. It may also be possible to complete the second workflow 3 during the period of a human task in the first workflow 2. After all, the two workflows 2 and 3 are finished in eleven minutes. This is equal to the execution time of the first workflow 2 alone.

If device action β in the second workflow 3 was performed before device action α in the first workflow 2, the device action α would be forced to wait for one minute. The two workflows 2 and 3 as a whole would thus take twelve minutes to finish, which is longer than the above-noted time in the case of device action α having priority over device action β.

That is, the computation unit 12 in the first embodiment is configured to raise the priority of a workflow 2 having more human tasks than another workflow 3, and allows its remote actions, in preference to other actions, to use an existing connection 4. This control makes it possible to finish the workflows 2 and 3 in a shorter time.

It is noted that workflows may include conditional branches. These conditional branches cause a variation in the number of unexecuted human tasks even within a workflow. Accordingly, the computation unit 12 investigates all possible paths in a workflow, from the currently running task toward the end point of the workflow, and calculates the number of human tasks with respect to each of the possible paths. The computation unit 12 then extracts the largest of the calculated numbers and uses it as the human task count of the workflow. This processing of the computation unit 12 gives priority to a workflow that could take the longest time to execute, thus achieving faster completion of multiple workflows.

It is also noted that some workflows may call other workflows. The called workflows are referred to as "sub-workflows." As described previously, the computation unit 12 determines priority for a calling workflow on the basis its human task count. The computation unit 12 may apply this priority of the calling workflow to sub-workflows. That is, a sub-workflow will gain a high priority if its calling workflow has a high priority. This high priority prevents delay of the sub-workflow, thus eliminating the possibility that the calling workflow is also delayed by a delay of its sub-workflow.

Sub-workflows are called in a synchronous manner or in an asynchronous manner. Synchronous call means that the calling workflow waits for completion of the called sub-workflow before proceeding to subsequent tasks. Asynchronous call means that the calling workflow immediately proceeds to subsequent tasks without waiting for completion of the sub-workflow. Here the computation unit 12 may use different policies for priority determination, depending on whether the call is a synchronous call or an asynchronous call. For example, in the case of synchronous call for a sub-workflow, the computation unit 12 first calculates priority of the calling workflow on the basis of its human task count and assigns that priority also to the sub-workflow. In the case of asynchronous call for a sub-workflow, the computation unit 12 calculates priority of the sub-workflow on the basis of its human task count and uses the priority as is for the sub-workflow. Sub-workflows called by asynchronous calls would not delay the processing of their calling workflows. The use of different priority determination policies prevents asynchronous sub-workflows from being given a high priority worthlessly and thus delaying other workflows.

While the example of FIG. 1 illustrates only one connection 4 to the device 1, it is also possible for the information processing apparatus 10 to establish two or more connections for the purpose of performing multiple workflows. However, if the number of connections is excessive, it would spoil the efficiency of communication with the device 1 when the connections are used for other purposes than workflows. Accordingly, the computation unit may be configured to stop extra connections. For example, the computation unit 12 compares the number of existing connections with the number of workflows that have performed tasks of remote operations on the device 1. When the connections outnumber the workflows, the computation unit 12 stops as many connections as the difference between the number of connections and the number of workflows. This control keeps the connections within an appropriate limit, thus enabling efficient communication between the information processing apparatus 10 and device 1.

For example, the above-described computation unit may be implemented as functions performed by a processor in the information processing apparatus 10. The above-described storage unit 11 may be implemented as part of memory devices or storage devices mounted in the information processing apparatus 10.

(B) Second Embodiment

Figure 2:
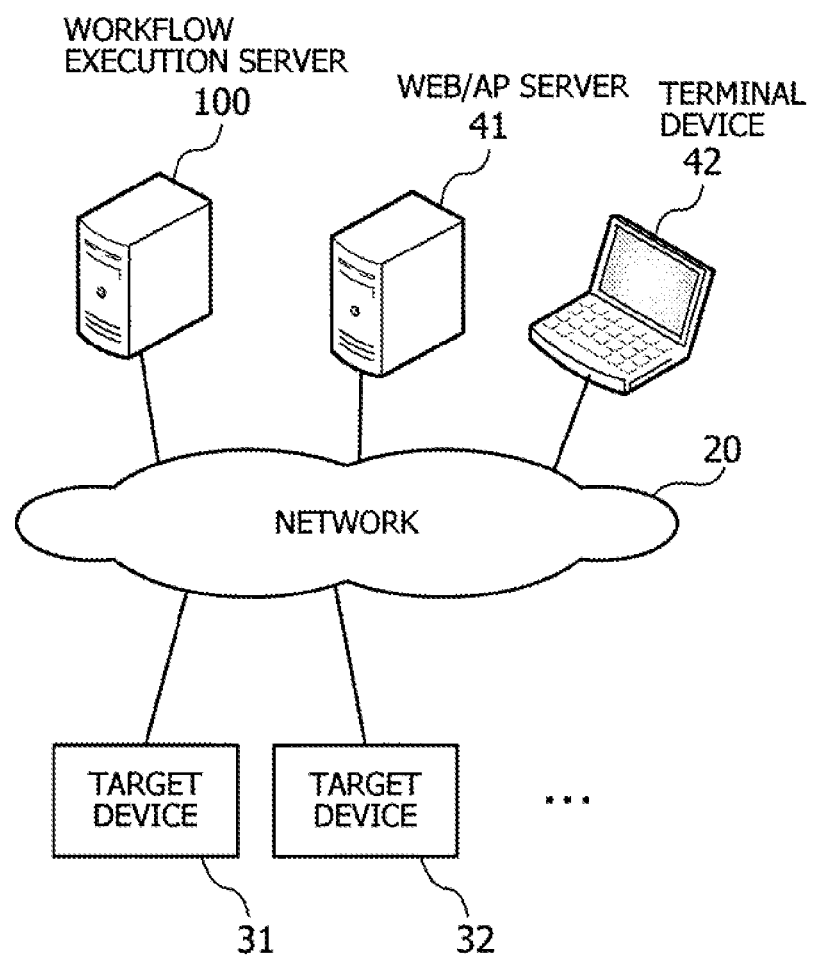
FIG. 2 illustrates an exemplary system configuration according to a second embodiment.

This part describes a second embodiment. FIG. 2 illustrates an exemplary system configuration according to a second embodiment. The network 20 seen in FIG. 2 interconnects a workflow execution server 100, a plurality of target devices 31, 32, . . . , a web/application (web/AP) server 41, and a terminal device 42.

The workflow execution server 100 is a computer that executes tasks on target devices 31, 32, . . . via remote control according to a given workflow(s). The target devices 31, 32, . . . include server devices, storage devices, switches, and other devices under operations management. The web/AP server 41 is a computer that executes programs, including web applications designed for workflow management purposes. The terminal device 42 is a computer that a manager uses to perform management operations. The next section will describe hardware of the workflow execution server 100.

Figure 3:
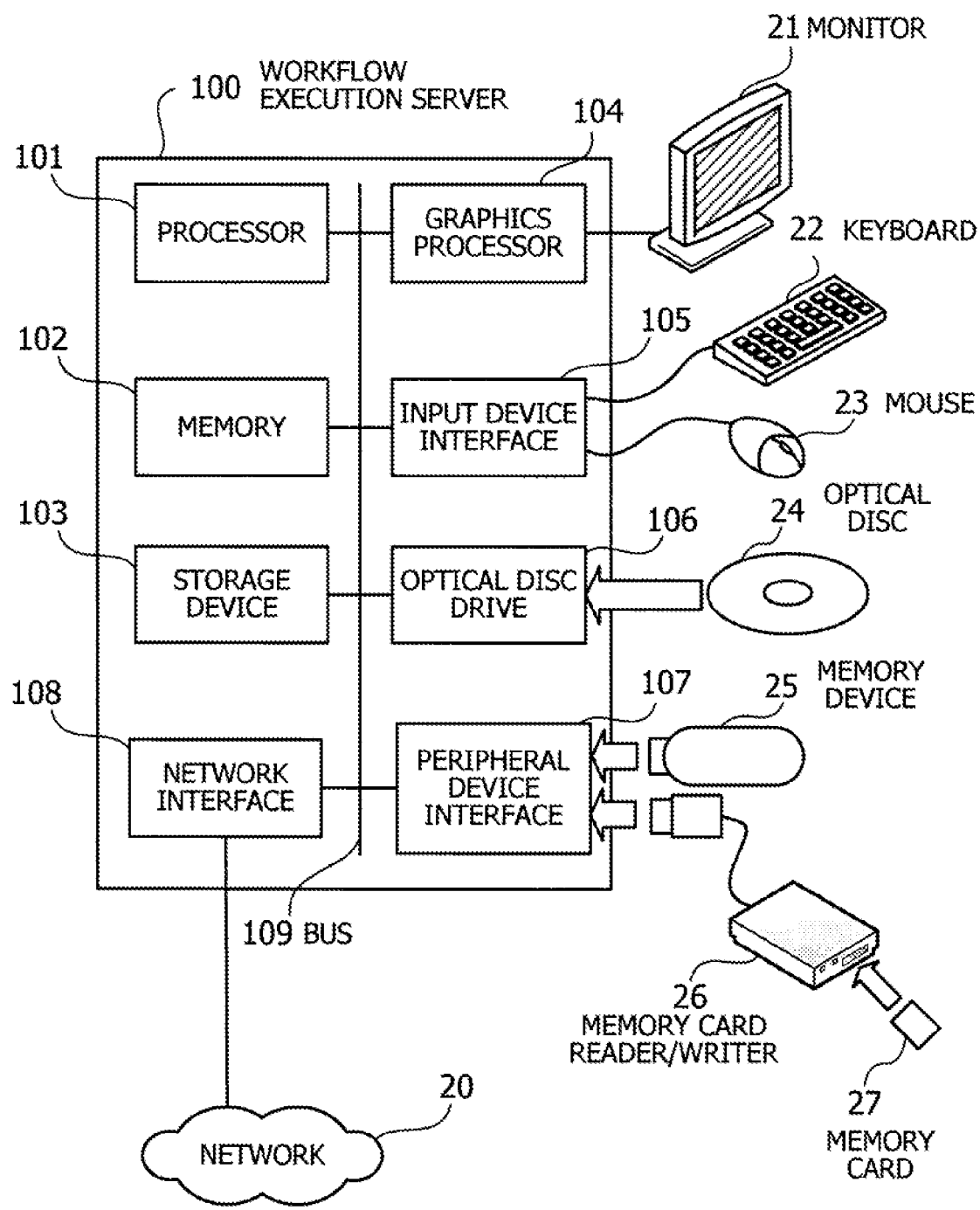
FIG. 3 illustrates an exemplary hardware configuration of a workflow execution server.

FIG. 3 illustrates an exemplary hardware configuration of a workflow execution server. The illustrated workflow execution server 100 has a processor 101 to control its entire operation. The processor 101 is connected to a memory 102 and other various devices and interfaces on a bus 109. The processor 101 may be a single processing device or a multiprocessor system including two or more processing devices. For example, the processor 101 may be a central processing unit (CPU), micro processing unit (MPU), or digital signal processor (DSP). It is also possible to implement processing functions of the processor 101 and its programs wholly or partly with an application-specific integrated circuit (ASIC), programmable logic device (PLD), or other electronic circuits, or any combination of them.

The memory 102 serves as the primary storage device in the workflow execution server 100. Specifically, the memory 102 is used to temporarily store at least some of the operating system (OS) programs and application programs that the processor 101 executes, as well as other various data objects that it manipulates at runtime. For example, the memory 102 may be implemented by using volatile semiconductor memory devices such as a random access memory (RAM).

Other devices on the bus 109 include a storage device 103, a graphics processor 104, an input device interface 105, an optical disc drive 106, a peripheral device interface 107, and a network interface 108.

The storage device 103 writes and reads data electrically or magnetically in or on its internal storage medium. The storage device 103 serves as a secondary storage device in the workflow execution server 100 to store program and data files of the operating system and applications. For example, the storage device 103 may be implemented by using a hard disk drive (HDD) or a solid state drive (SSD).

The graphics processor 104, coupled to a monitor 21, produces video images in accordance with drawing commands from the processor 101 and displays them on a screen of the monitor 21. The monitor 21 may be, for example, a cathode ray tube (CRT) display or a liquid crystal display.

The input device interface 105 is connected to input devices such as a keyboard 22 and a mouse 23 and supplies signals from those devices to the processor 101. The mouse 23 is a pointing device, which may be replaced with other kind of pointing devices such as touchscreen, tablet, touchpad, and trackball.

The optical disc drive 106 reads out data encoded on an optical disc 24, by using laser light. The optical disc 24 is a portable data storage medium, the data recorded on which can be read as a reflection of light or the lack of the same. The optical disc 24 may be a digital versatile disc (DVD), DVD-RAM, compact disc read-only memory (CD-ROM), CD-Recordable (CD-R), or CD-Rewritable (CD-RW), for example.

The peripheral device interface 107 is a communication interface used to connect peripheral devices to the workflow execution server 100. For example, the peripheral device interface 107 may be used to connect a memory device 25 and a memory card reader/writer 26. The memory device 25 is a data storage medium having a capability to communicate with the peripheral device interface 107. The memory card reader/writer 26 is an adapter device used to write data to or read data from a memory card 27, which is a data storage medium in the form of a small card.

The network interface 108 is connected to a network 20 so as to exchange data with other computers or network devices (not illustrated).

The above-described hardware platform may be used to implement processing functions of the workflow execution server 100 according to the second embodiment. The same hardware configuration of FIG. 3 may similarly be used to implement the web/AP server 41 and terminal device 42. This is also true with the information processing apparatus 10 discussed in the first embodiment.

The workflow execution server 100 provides various processing functions of the second embodiment by executing computer programs stored in a computer-readable storage medium. A variety of storage media are available for these computer programs. For example, the workflow execution server 100 may store program files in its local storage device 103. The processor 101 reads out at least part of the programs stored in the storage device 103, loads them into the memory 102, and executes the loaded programs. Other possible storage locations for the programs include optical discs 24, memory devices 25, memory cards 27, and other portable storage media. The programs stored in a portable storage medium are installed into the storage device 103 under the control of the processor 101, so that they are ready to execute upon request. It may also be possible for the processor 101 to execute program code read out of a portable storage medium, without installing them in its local storage devices.

The description will now turn to the functions provided in each device for executing workflows.

Figure 4:
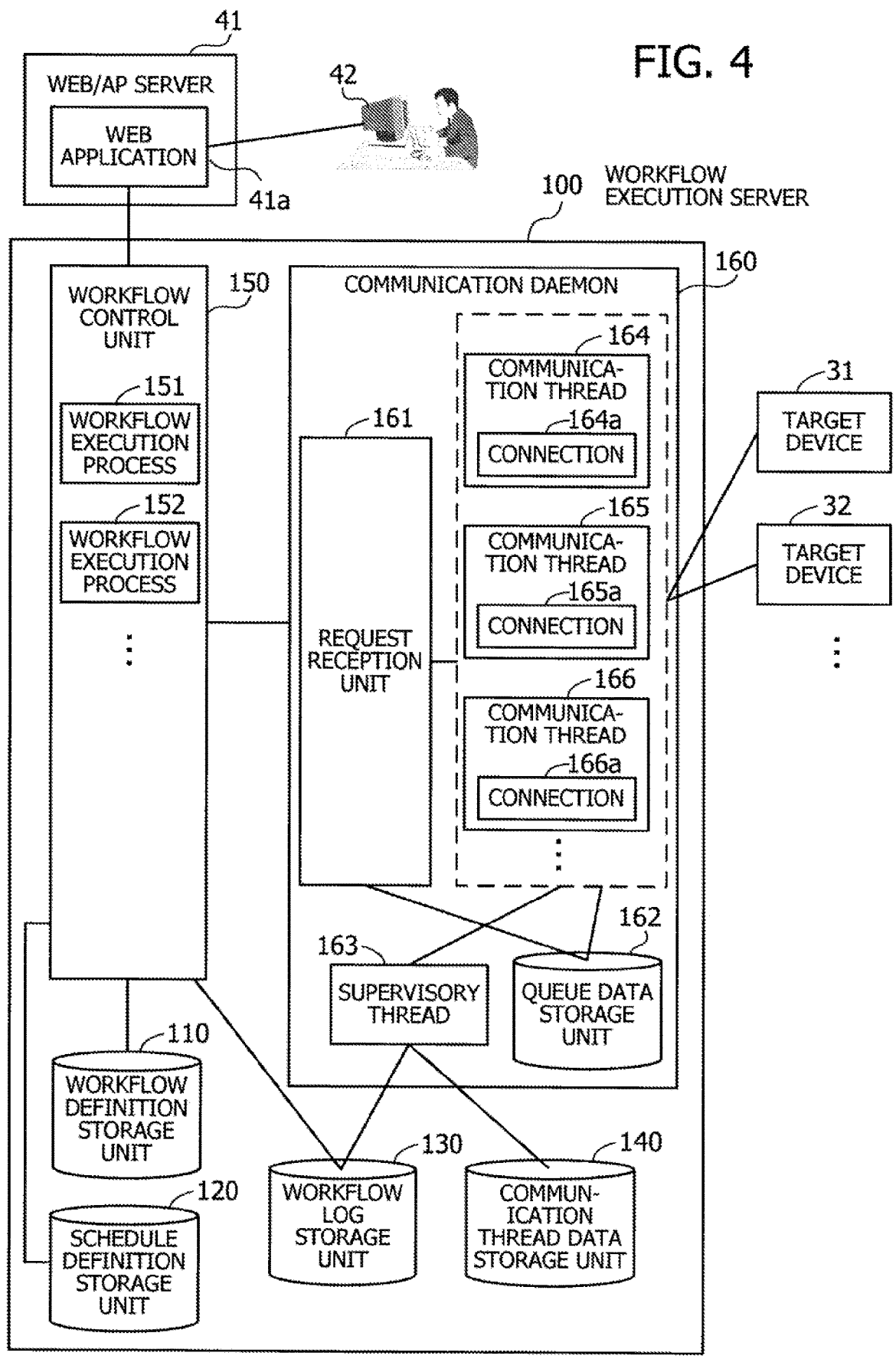
FIG. 4 is a block diagram illustrating functions for workflow execution.

FIG. 4 is a block diagram illustrating functions for workflow execution. A manager makes access to the web/AP server 41 using his or her terminal device 42 and enters a workflow execution schedule and other management data to a web application 41a in the web/AP server 41. In response, the web/AP server 41 executes the requested web application 41a and informs the workflow execution server 100 of workflow definitions, workflow execution schedule, and the like.

The workflow execution server 100 includes a workflow definition storage unit 110, a schedule definition storage unit 120, a workflow log storage unit 130, a communication thread data storage unit 140, a workflow control unit 150, and a communication daemon 160.

The workflow definition storage unit 110 stores therein workflow definitions each describing a task procedure of a workflow. The schedule definition storage unit 120 stores schedule definitions each describing an execution schedule of a workflow. The workflow log storage unit 130 stores execution status information about workflows. The communication thread data storage unit 140 stores information about communication threads 164, 165, 166, . . . that control communication with target devices 31, 32, . . . .

The workflow control unit 150 creates workflow execution processes 151, 152, . . . for execution of workflows and controls workflow execution by using these workflow execution processes 151, 152, . . . . For example, the workflow control unit 150 creates workflow execution processes 151, 152, . . . in response to a user command for execution of a workflow, or at a specific execution start time that was previously defined in a workflow schedule. The workflow execution processes 151, 152, . . . generate priority data for their respective workflows on the basis of input information given at the time of execution, thus becoming ready to communicate with target devices. When a need arises for communication with a certain target device, the workflow execution processes 151, 152, . . . request it to the communication daemon 160 by sending a communication request to the same.

The communication request is supposed to convey the following pieces of information:
Connection parameters for target device
Priority data of workflow
Workflow data
Actions to perform When a workflow reaches the time for a human task, its corresponding workflow execution process 151, 152, . . . waits for a notification from the web/AP server 41 that indicates completion of the human task.

The communication daemon 160 manages communication with target devices 31, 32, . . . in a concentrated manner so that the workflow execution server 100 can manage their operations. For the purpose of communication management, the communication daemon 160 includes a request reception unit 161, a queue data storage unit 162, a supervisory thread 163, and communication threads 164, 165, 166, . . . .

The request reception unit 161 accepts communication requests that the workflow execution processes 151, 152, issues to target devices 31, 32, . . . . When a communication request arrives, the request reception unit 161 assigns an available communication thread to the request.

The queue data storage unit 162 stores therein communication requests that are pending.

The supervisory thread 163 keeps track of active workflows running in the workflow execution processes 151, 152, . . . with reference to the workflow log storage unit 130, so as to detect their completion. When a workflow is finished, the supervisory thread 163 performs a termination process to close its corresponding communication thread because it is now obsolete.

The communication threads 164, 165, 166, . . . establish connections 164a, 165a, 166a, with target devices 31, 32, . . . and communicate with them via these connections. The communication threads 164, 165, 166, . . . then execute actions on the target devices 31, 32, . . . in accordance with what is described in the received communication requests and returns their respective results to the workflow execution processes 151, 152, . . . .

It is noted that the lines interconnecting the functional blocks in FIG. 4 represent some of their communication paths. The person skilled in the art would appreciate that there may be other communication paths in actual implementations. Each of these functional blocks may be implemented in the form of a program module. A computer executes such program modules, thereby providing their encoded functions.

Now with reference to FIGS. 5 to 9, the following part of the description will describe in detail what information is held in various storage units in the workflow execution server 100.

Figure 5:
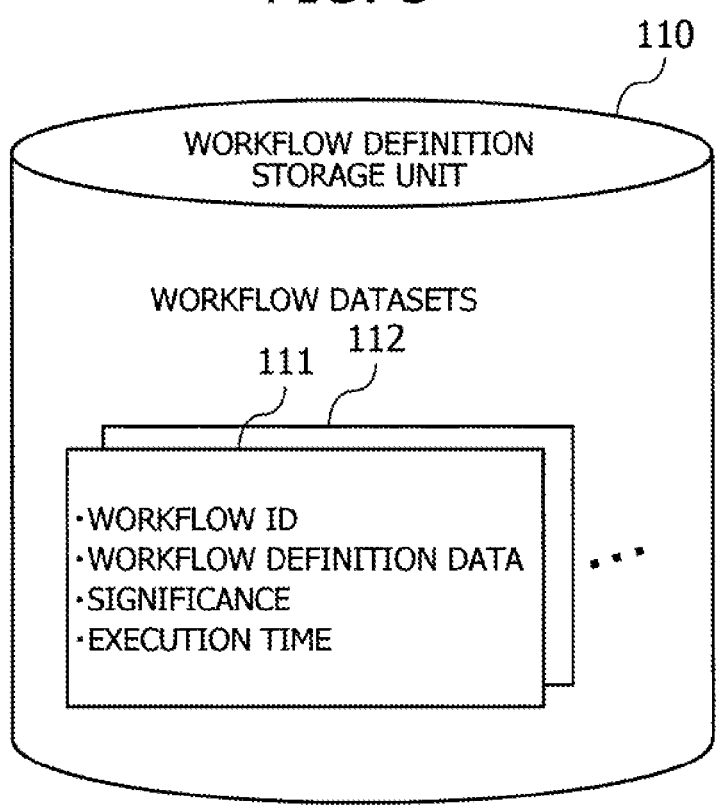
FIG. 5 illustrates an example of a workflow definition storage unit.

FIG. 5 illustrates an example of a workflow definition storage unit. The illustrated workflow definition storage unit 110 stores therein a plurality of workflow datasets 111, 112, . . . corresponding to different workflows. Each of these workflow datasets 111, 112, . . . includes information such as workflow ID, workflow definition data, significance, and execution time. Workflow ID is an identifier for distinguishing each workflow from others. Workflow definition data indicates a specific procedure of operations management. Significance is a numerical value representing the significance of a workflow. Execution time indicates the length of time needed for execution of a workflow.

Figure 6:
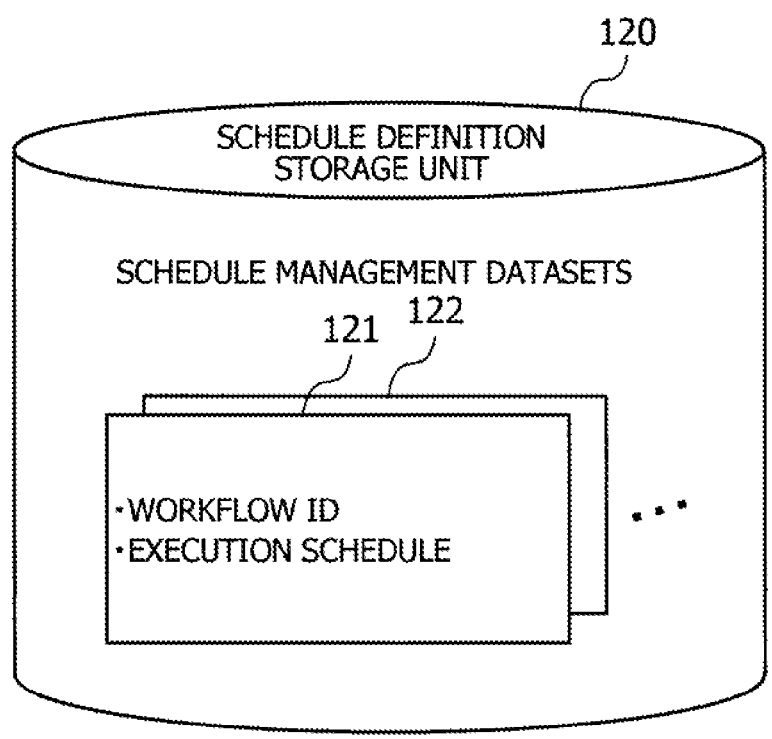
FIG. 6 illustrates an example of a schedule definition storage unit.

FIG. 6 illustrates an example of a schedule definition storage unit. The schedule definition storage unit 120 stores therein a plurality of schedule management datasets 121, 122, . . . corresponding to different workflows. Each of these schedule management datasets 121, 122, . . . includes information about its corresponding workflow, such as workflow ID and execution schedule. Execution schedule is a piece of information that defines execution start date and time, as well as execution end date and time, of a workflow.

Figure 7:
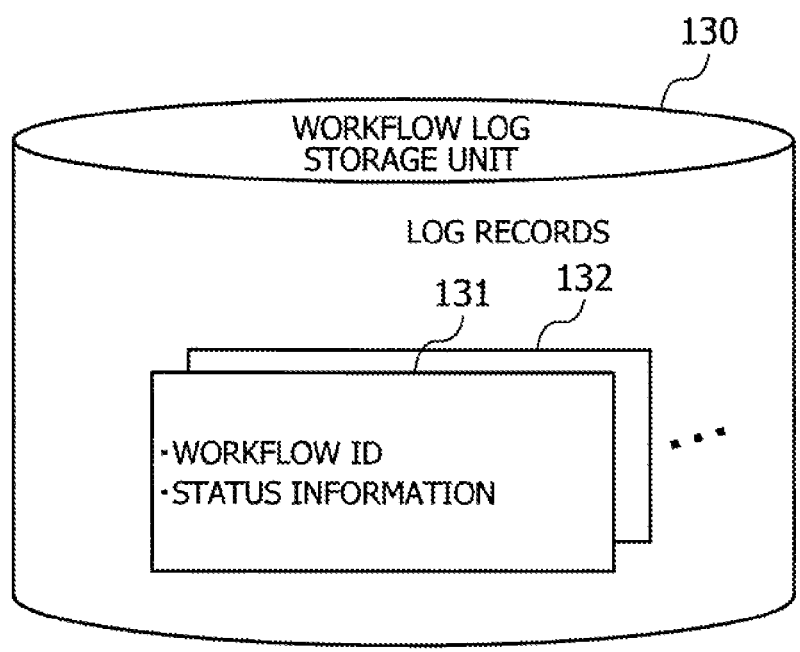
FIG. 7 illustrates an example of a workflow log storage unit.

FIG. 7 illustrates an example of a workflow log storage unit. The illustrated workflow log storage unit 130 stores therein a plurality of log records 131, 132, . . . corresponding to different workflows. Each of these log records 131, 132, . . . includes information such as workflow ID and status information about its corresponding workflow. Status information indicates execution status of a workflow.

Figure 8:
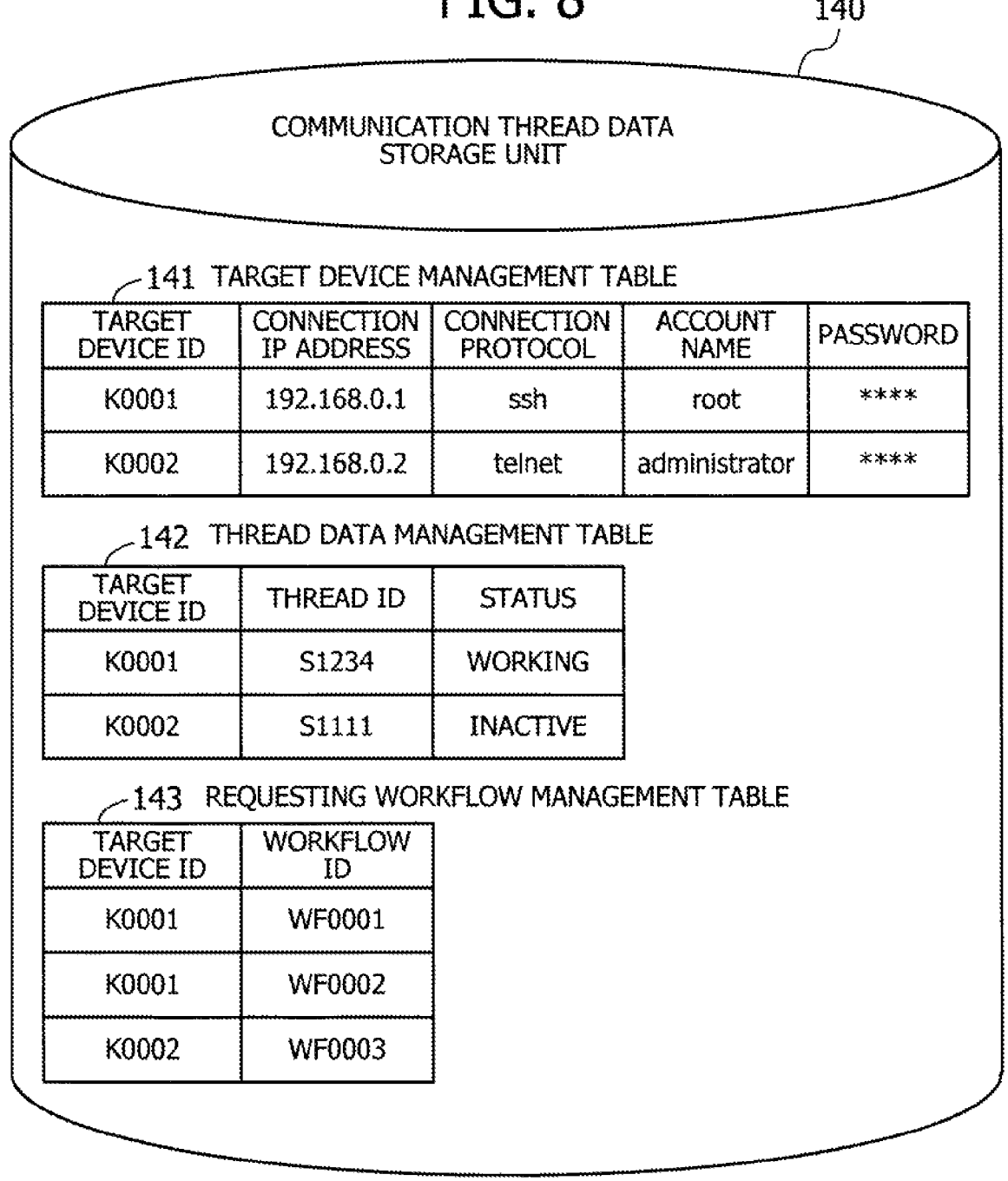
FIG. 8 illustrates an example of a communication thread data storage unit.

FIG. 8 illustrates an example of a communication thread data storage unit. The illustrated communication thread data storage unit 140 stores therein a target device management table 141, a thread data management table 142, and a requesting workflow management table 143.

The target device management table 141 is a data table that stores information about target devices 31, 32, . . . . Specifically, each entry of this target device management table 141 has the following data fields: target device ID, connection Internet Protocol (IP) address, connection protocol, account name, and password. The target device ID field contains an identifier of a specific target device 31, 32, . . . , which is referred to herein as a "target device ID." The connection IP address field contains IP address of that specific target device 31, 32, . . . , and the connection protocol field indicates communication protocols used to communicate with the same. Note that two or more communication protocols may be used to communicate with a target device. The account name field contains an account name used to connect with a corresponding target device by using a corresponding connection protocol. The password field contains an authentication password used at the time of setting up a connection with a target device by using a corresponding account name.

The thread data management table 142 is a data table that stores information about communication threads. Each entry of this thread data management table 142 has the following data fields: target device ID, thread ID, and status. The target device ID field contains a target device ID that indicates which target device 31, 32, . . . to communicate with, and the thread ID contains an identifier (thread ID) of a communication thread that communicates with that target device. The status field indicates the status of a corresponding communication thread.

The requesting workflow management table 143 is a data table that indicates mapping relationships between target devices and workflows. More specifically, each entry of the requesting workflow management table 143 has the following data fields: target device ID and workflow ID. The target device ID field contains a target device ID of a target device 31, 32, . . . with which the workflow execution server 100 is communicating. The workflow ID field contains an identifier (workflow ID) that indicates a workflow being executed by a requesting workflow execution process (the sender of a communication request).

FIG. 9 illustrates an example of a queue data storage unit. The illustrated queue data storage unit 162 stores therein a communication request management table 162a. This communication request management table 162a has the following data fields: target device ID, priority, requester information, and requested task information. Each entry is associated with a specific communication request that is currently in process. Target device ID field contains a target device ID of a target device that is executing the requested task, whose completion is waited for by the workflow execution server 100. The priority field indicates several criteria for determining priority of the communication request of interest. The requester information field contains a workflow ID that indicates a specific workflow being executed by the requesting workflow execution process. The requested task information field describes tasks requested by the communication request.

In the example of FIG. 9, the priority criteria include significance, target completion date and time, remaining human task count, and start date and time. These criteria have their own subfields in the communication request management table 162a. The significance subfield indicates significance of the corresponding workflow. The target completion date and time subfield indicates desired date and time at which the corresponding workflow is supposed to finish. The remaining human task count subfield indicates the maximum number of human tasks that may be encountered later in the corresponding workflow. The start date and time subfield indicates the date and time at which the corresponding workflow started to run.

The proposed workflow execution server 100 is configured in the way described above, and the described configuration makes it possible to execute workflows more efficiently. More specifically, the proposed workflow execution server 100 centrally manages connections made by the communication daemon 160. The workflow execution server 100 shares these connections dynamically. That is, the workflow execution server 100 allows multiple workflows to share existing unused connections if such connections are available when a communication request arises. When all connections are in use, or when there is no existing connection, the workflow execution server 100 creates a new connection and maintains it until the workflow corresponding to the connected target device finishes.

In addition to the above, the proposed workflow execution server 100 provides a queuing function that considers workflow-specific priorities to resolve communication errors when the number of connections with a target device exceeds an upper limit. The priority of each workflow is determined on the basis of its significance, target completion date and time, remaining human task count, multi-level structure of workflows, and the like.

(a) Dynamic Connection Sharing

Figure 10:
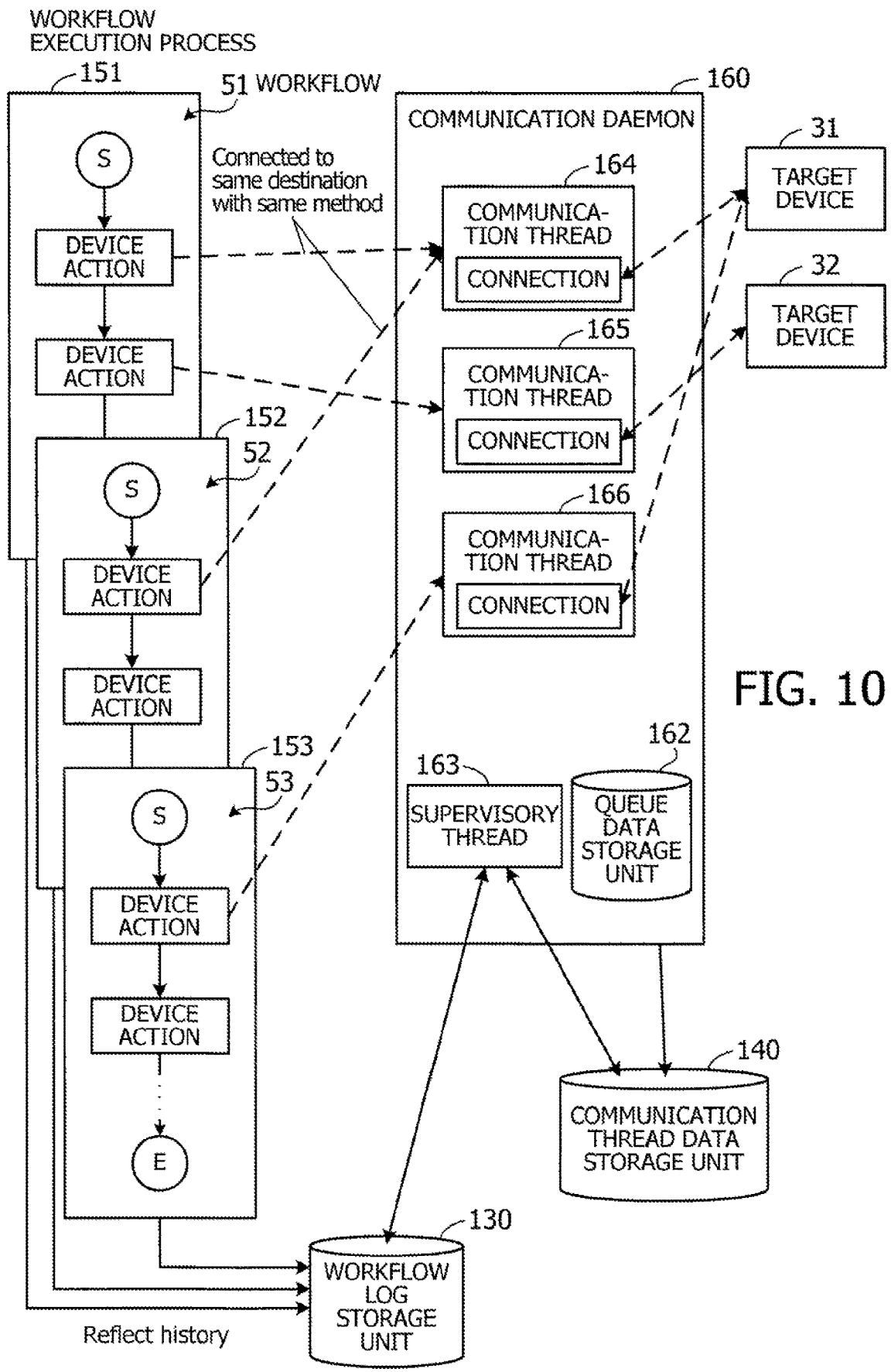
FIG. 10 illustrates an example of dynamic connection sharing in a workflow execution server.

This section provides a specific description about dynamic connection sharing. FIG. 10 illustrates an example of dynamic connection sharing in a workflow execution server. Different workflows have different pieces of destination information (i.e., destination address, communication protocol, connection account, connection count) to indicate their respective target devices to which operational actions are directed. Also, the user may enter an execution command for workflows even when there is no established schedule for these workflows. These things make it difficult to name the exact execution date and time of each workflow. Further, some workflows may include conditional branches to different tasks. This means that it is impossible to determine which tasks would be executed and which target devices would receive a communication request, until their respective branching conditions are solved. For these reasons, the workflow execution server 100 is unable to previously determine the destination of connections or the number of connections to be established.

In view of the above things, the workflow execution server 100 has a mechanism for sharing connections. A usual connection sharing method determines beforehand the number of communication requests that can be executed concurrently and establishes as many connections as the determined number. However, as noted above, it is not possible to determine beforehand which workflow will be executed at what time, and no one can tell whether a workflow issues a communication request before its branching condition is solved. The usual connection sharing method thus establishes many connections in accordance with the largest possible number of simultaneous communication requests and maintains those connections all the time. This results in a large number of unused connections, causing stress to other communication tasks.

In view of the above, the workflow execution server 100 according to the second embodiment performs connection pooling at the time of each communication request and shares the pooled connections in a dynamic manner. This method is called "dynamic connection sharing." Some workflows may designate the same destination and conditions for their connections. The dynamic connection sharing permits such workflows to share the connections, thus preventing the number of connections from increasing too much. When the end of a workflow is detected, its corresponding connection is released for use by other workflows, not to allow the connection to remain unused.

Dynamic connection management is one of the functions of the communication daemon 160. For example, to share communication connections, the communication daemon 160 controls communication threads 164, 165, 166, . . . on the basis of the following information:

issuance of communication request
destination of connection (connection IP address)
connection account
connection protocol
information about requesting workflow
workflow status In the example of FIG. 10, three workflow execution processes 151 to 153 are executing workflows 51 to 53, respectively. When one workflow execution process 151 executes the first task of device action as part of its workflow 51, a communication request is sent from the workflow execution process 151 to the communication daemon 160. Likewise, when another workflow execution process 152 executes the first task of device action as part of its workflow 52, a communication request is issued from the workflow execution process 152 to the communication daemon 160. Suppose now that these two workflow execution processes 151 and 152 have addressed their communication requests to the same destination, specifying the same connection method (i.e., the same connection account and protocol). In this case, the communication daemon 160 invokes a communication thread 164 to process the two communication requests. The communication thread 164 establishes a connection with the destination target device 31 as specified in the communication requests and executes requested actions on the target device 31.

The workflow execution process 151 then proceeds to the second device action in the workflow 51. This device action is directed to another target device 32. Accordingly, the workflow execution process 151 sends the communication daemon 160 a communication request addressed to the target device 32 to execute the task of that device action. In response, the communication daemon 160 invokes a new communication thread 165. This communication thread 165 establishes a connection with the target device 32 as specified in the communication request and executes requested actions on the target device 32.

Yet another workflow execution process 153 is executing a workflow 53 whose first device action is directed to the target device 31, but with a connection method that is different from the method specified by the above two workflows 51 and 52. In this case, the communication daemon 160 invokes a new communication thread 166 in response to a communication request that the workflow execution process 153 has issued to the target device 31 for execution of its device action. The communication thread 166 establishes another connection to the destination target device 31 and executes requested actions on the target device 31.

As can be seen from the above example, the communication daemon 160 processes two communication requests with a single communication thread when these communication requests are addressed to the same destination and use the same connection method. When two requests use different connection methods, the communication daemon 160 assigns two different communication threads to these requests even if they are directed to the same destination.

The workflow execution processes 151 to 153 store and update execution status records of workflows 51 to 53 in the workflow log storage unit 130. For example, the workflow execution processes 151 to 153 enter a value of "In Execution" to the workflow log storage unit 130 when their respective workflows 51 to 53 have started to run. When any of these workflows 51 to 53 is finished, its corresponding workflow execution process 151 to 153 changes the status of that workflow 51 to 53 to "Stopped."

The communication daemon 160, on the other hand, stores and updates information about communication threads 164 to 166 in the communication thread data storage unit 140. The communication daemon 160 includes a supervisory thread 163. This supervisory thread 163 analyzes what is stored in the workflow log storage unit 130 and communication thread data storage unit 140 to determine whether there is any redundant communication thread. For example, when the number of existing communication threads is greater than the number of active workflows with a status value of "In Execution," the supervisory thread 163 finds the excessive ones to be redundant and executes a deletion process to stop the functions of those redundant communication threads. The number of communication threads is controlled in this way, depending on the execution status of workflows.

(b) Starting Up Communication Thread

The communication daemon 160 invokes a minimum number of communication threads as needed for the purpose of dynamic connection sharing. Specifically, the communication daemon 160 has a request reception unit 161 to receive communication requests from workflow execution processes. Upon receipt of a specific communication request, the request reception unit 161 checks the presence of a communication thread for the specified destination target device and determines whether the thread (if exists) is currently available for use, with reference to the communication thread data storage unit 140. If there is an available communication thread (i.e., a communication thread having matching connection parameters and being in "Stopped" state), the communication daemon 160 assigns the received communication request to that existing communication thread. If there is no available communication thread, then the communication daemon 160 creates a new communication thread to achieve the requested communication.

Figure 11:
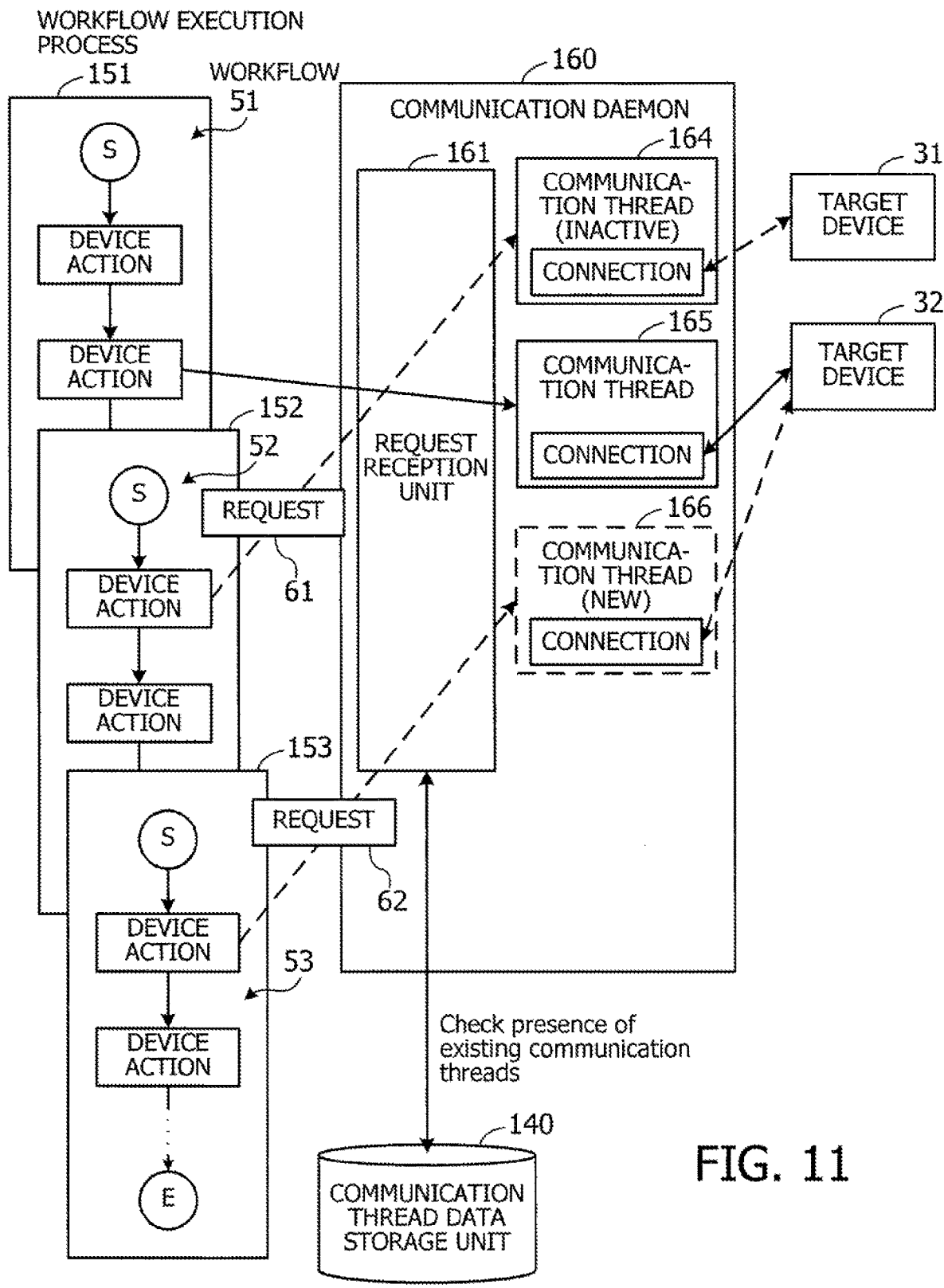
FIG. 11 illustrates an exemplary startup of a communication thread.

FIG. 11 illustrates an exemplary startup of a communication thread. Suppose, for example, that two communication threads 164 and 165 are running in the communication daemon 160, where one communication thread 164 (referred to as the "first communication thread") is inactive, but the other communication thread 165 (referred to as the "second communication thread") is handling communication requests from a workflow execution process 151. The first communication thread 164 has a connection with a target device 31. The second communication thread 165 has a connection with a different target device 32.

Another workflow execution process 152, hosting a workflow 52, then outputs a communication request 61 that specifies a target device 31 as the destination of a connection. It is assumed that this communication request 61 specifies the same connection method as the method that the first communication thread 164 previously used to connect with the target device 31. Upon receipt of the communication request 61, the request reception unit 161 looks into the communication thread data storage unit 140 to check the presence of existing communication threads and their usage status. In the present context, there is an unused communication thread 164 in "Inactive" state. This communication thread 164 previously established a connection with the target device 31 by using the same method as specified in the current communication request 61. Accordingly, the request reception unit 161 delegates the task of the communication request 61 to the first communication thread 164.

Suppose now that yet another workflow execution process 153, hosting a workflow 53, outputs a communication request 62 that specifies a target device 32 as the destination of a connection. It is assumed that this communication request 62 specifies the same connection method as the method that the second communication thread 165 previously used to connect with the target device 32. Upon receipt of the communication request 62, the request reception unit 161 looks into the communication thread data storage unit 140 to check the presence of existing communication threads and their usage status. In the present context, there is an existing communication thread 165 which established a connection with the target device 31 by using the same method as specified in the current communication request 61. This communication thread 165 is, however, in "Working" state. Accordingly, the request reception unit 161 generates a new communication thread 166 and delegates the task of the communication request 62 to the new communication thread 166.

Figure 12:
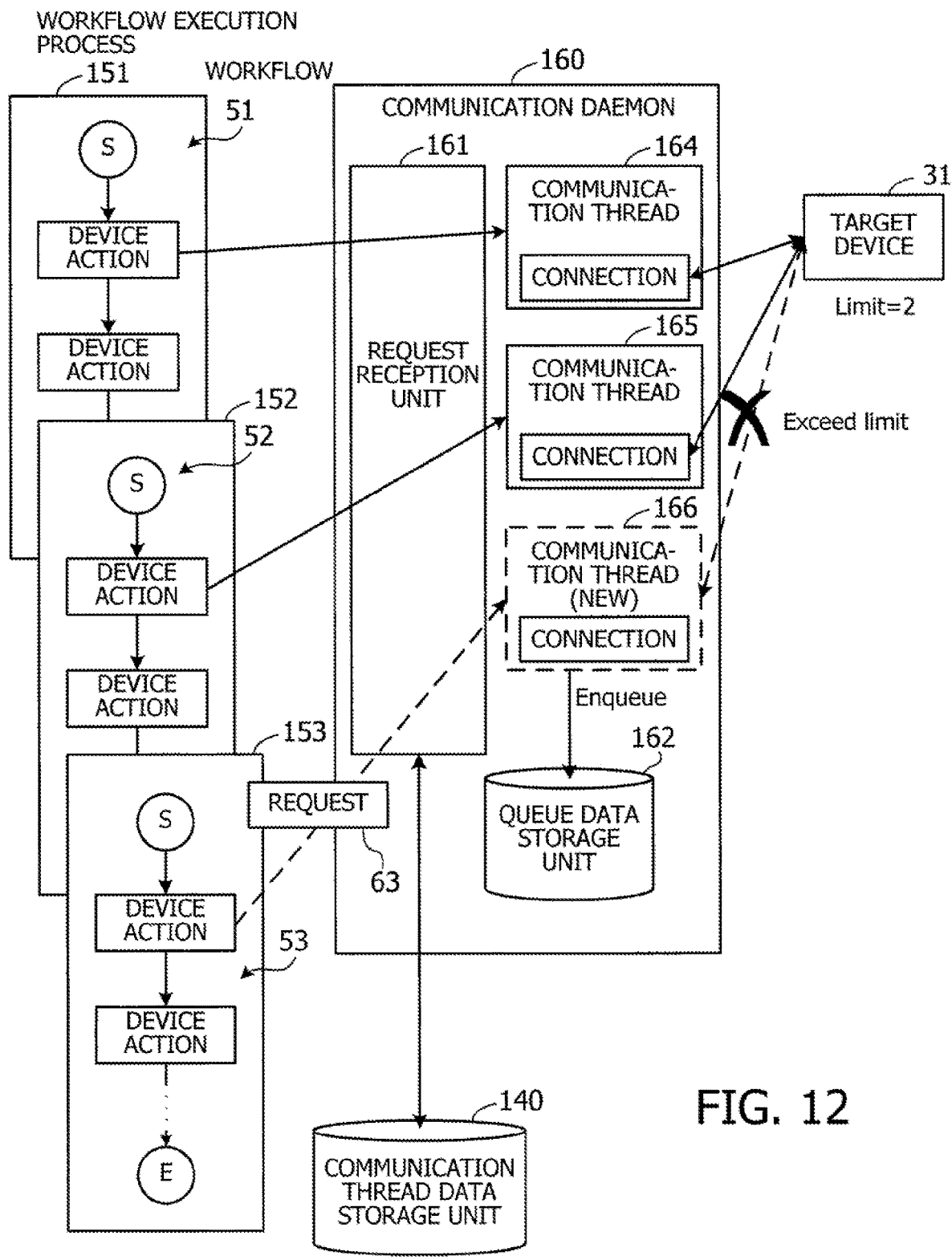
FIG. 12 illustrates an example of when the number of connections to a target device exceeds its upper limit.

It is noted here that the number of connections to a target device is limited. The proposed workflow execution server 100 operates in the following way in the event that connections exceeds their upper limit. FIG. 12 illustrates an example of when the number of connections to a target device exceeds its upper limit. The communication daemon 160 newly invokes a communication thread when existing communication threads serving the target device specified in a communication request are all in use. If the number of connections to the target device has already reached the upper limit, the attempt to set up a connection for the new communication thread ends up with an excessive connection error. Upon detection of this error, the communication thread terminates itself after enqueuing the communication request into the queue data storage unit 162. Specifically, the communication thread also enters several pieces of additional information (e.g., significance, target completion date and time, and the like) to the queue data storage unit 162 for later use as criteria for priority determination.

Referring to the example of FIG. 12, two communication threads 164 and 165 have established their respective connections with a target device 31 and are using them for communication. Suppose that the target device 31 permits up to two simultaneous connections (i.e., maximum simultaneous connections=2). Also suppose that one workflow execution process 153 hosting a workflow 53 has issued a communication request 63 that specifies a target device 31 for connection. In response, the communication daemon 160 starts up a new communication thread 166. This communication thread 166 attempts to set up a connection with the target device 31 without success, because the target device 31 has reached its maximum simultaneous connections and is unable to add a new connection. Accordingly, the target device 31 sends an error message to the communication thread 166 to indicate that the device's connection count would exceed its upper limit. Upon receipt of this error message, the communication thread 166 enqueues the pending communication request 63 into the queue data storage unit 162 and terminates its own processing.

Figure 13:
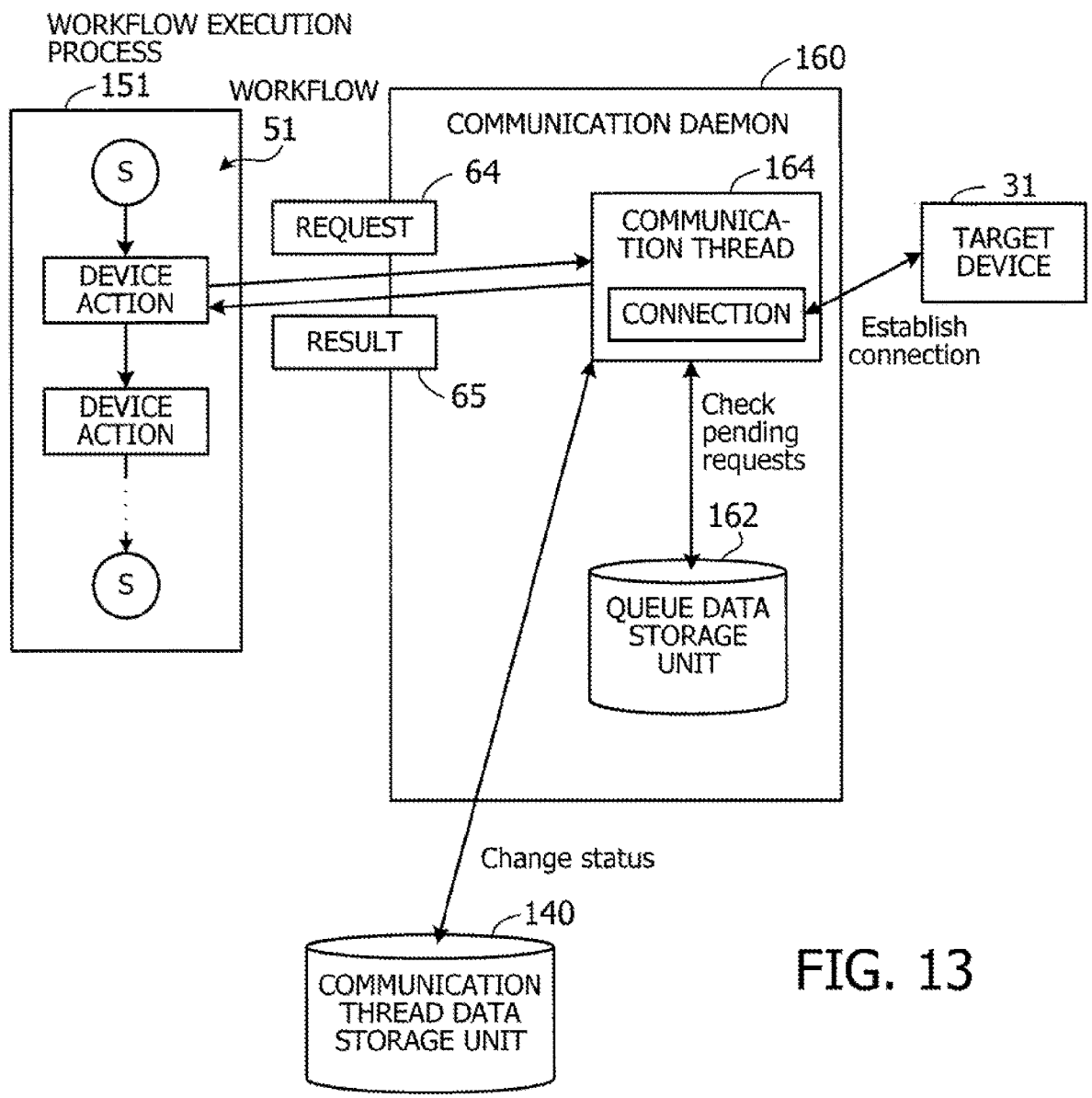
FIG. 13 illustrates an example of processing operations performed in a communication thread.

The following section will now provide more details about the operation of communication threads. FIG. 13 illustrates an example of processing operations performed in a communication thread. For example, the illustrated communication thread 164 establishes a connection with a target device 31 upon receipt of a communication request 64. The communication thread 164 then executes a device action according to the communication request 64. Upon completion of this device action, the communication thread 164 sends its processing result 65 back to the requesting workflow execution process 151. The communication thread 164 further looks into the queue data storage unit 162 to check whether any pending request is present with respect to the target device 31. If such a communication request is found, the communication thread 164 retrieves it and continues the communication with the target device 31. If there is no such pending request, the communication thread 164 changes its own status value in the communication thread data storage unit 140 to "Inactive" and enters into an inactive state while holding the current connection. The connection held in the inactive communication thread 164 thus becomes unused.

(c) Stopping Communication Thread

Figure 14:
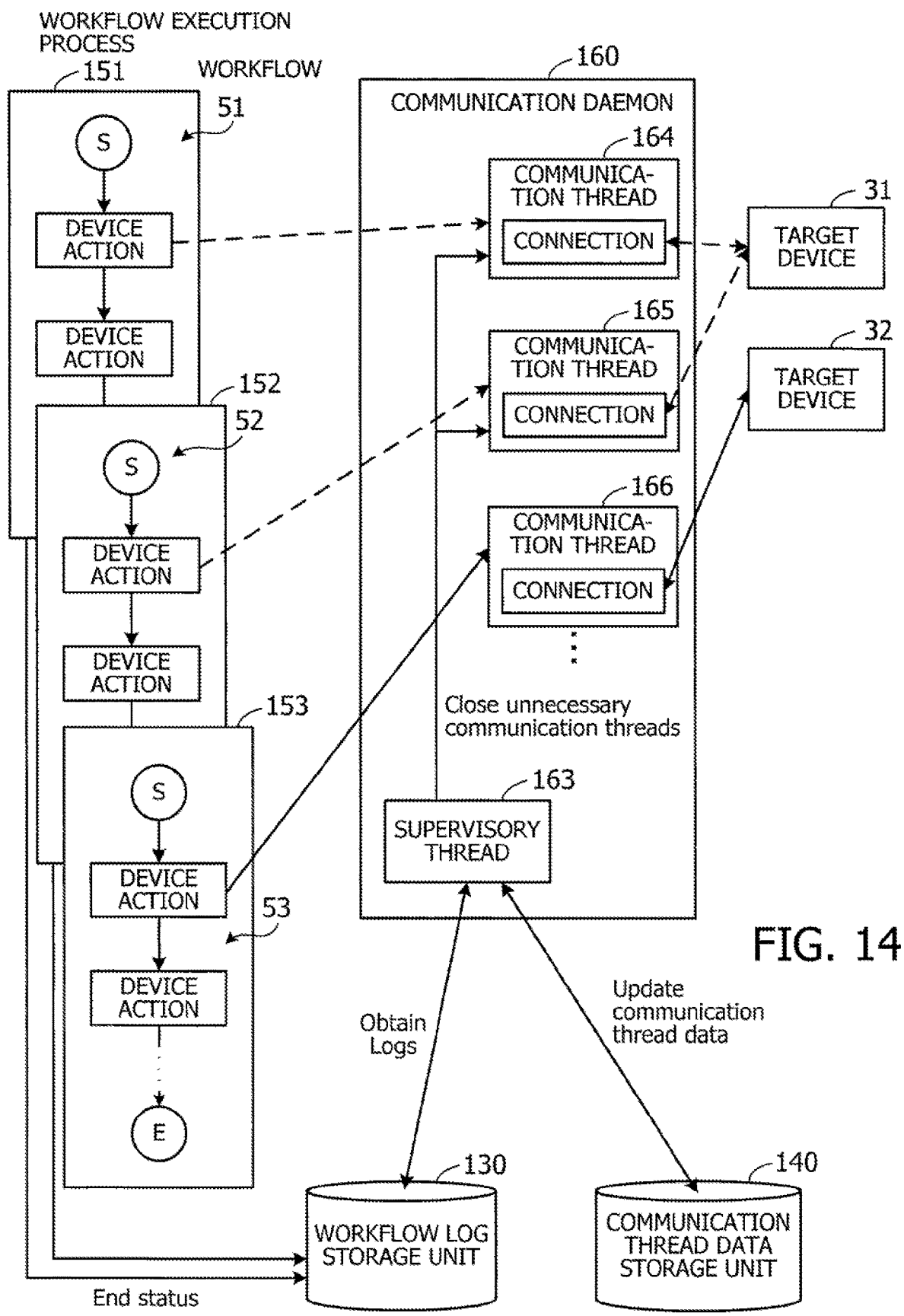
FIG. 14 illustrates an example of communication thread management performed by a supervisory thread.

This section specifically explains how the supervisory thread 163 stops redundant communication threads. FIG. 14 illustrates an example of communication thread management performed by a supervisory thread. A communication thread becomes obsolete when it has finished communication requests and its associated workflows are all completed. Excessive communication threads (i.e., more than the number of active workflows) are also considered unnecessary. The supervisory thread 163 thus terminates such unnecessary communication threads discovered during the course of monitoring the number of active workflows and the operation status of each communication thread.

For example, the supervisory thread 163 starts its operation in response to a communication request from a workflow execution process. The supervisory thread 163 keeps track of activities of communication threads until the last one of them is closed.

The supervisory thread 163 also extracts information about active workflows out of the workflow log storage unit 130 at regular intervals. The supervisory thread 163 updates communication thread data in the communication thread data storage unit 140 to reflect the current operation status of each workflow in the requesting workflow data. Based on the updated communication thread data, the supervisory thread 163 may terminate an unnecessary communication thread and removes information about that thread from the communication thread data. The supervisory thread 163 selects which communication thread to remove, from among the threads in inactive state. As a result of this removal of a communication thread, some of the target devices may completely lose connections with existing communication threads. In that case, the supervisory thread 163 removes information about such target devices from the communication thread data storage unit 140.

(d) Workflow Priority

In the dynamic connection sharing environment, multiple communication requests are processed with a limited number of communication threads by using their established connections. When there are two or more pending communication requests issued from workflow execution processes hosting different workflows, the order of their execution is determined on the basis of priority of the requesting workflows.

It is a part of the responsibility of the communication daemon 160 to determine the order of communication requests in a queue according to workflow priorities. Workflows may be classified into, for example, three groups with high, middle, and low priorities, but this simple classification is not sufficient for the determination of execution order. Also, a workflow may be formed as a combination of multiple workflows, in which case the priority logic for lower-layer workflows will be of significance.

For example, the communication daemon 160 enqueues each received communication request into the queue data storage unit 162 and executes queued requests in the order of priorities of their source workflows. The communication daemon 160 automatically determines priority of a workflow on the basis of the following parameters:

Parameter 1: Significance of workflow (specified in workflow dataset or designated upon execution)
Parameter 2: Target completion date and time of workflow (specified as execution time relative to the start time of the workflow or scheduled end date and time of the workflow)
Parameter 3: The number of remaining human tasks in workflow
Parameter 4: Start date and time of workflow Workflows called up by another workflow are referred to as sub-workflows. The priority of a sub-workflow is determined with consideration of the noted parameters of its calling workflow. Different methods may be used for this priority determination, depending on whether the sub-workflow in question is a synchronous sub-workflow or an asynchronous sub-workflow.

d1) Priority of Stand-Alone Workflow

Before discussing synchronous and asynchronous sub-workflows, this subsection explains how the priority is determined in the case of "stand-alone" workflows, i.e., workflows having no caller-caller relationship with any other workflow. Specifically, the priority of a stand-alone workflow is determined from the combination of four parameters described below:

i) Parameter 1: Significance of Workflow

Workflows may be classified into, for example, three groups with high, middle, and low significance. The significance of a workflow is determined from what the workflow performs. Suppose, for example, that a troubleshooting workflow is invoked to solve a problem that has a bad impact on business activities. This workflow has to be executed in preference to others and would thus be given a high priority. On the other hand, workflows for data backup or the like may be of low priority because a delay of such workflows would not affect business activities.

The significance of workflows may be determined beforehand as part of workflow definitions, or may be specified as part of input parameters given when workflows are executed. Both of these two methods may be used, in which case the latter one (i.e., input parameters) is taken in preference to the former one.

ii) Parameter 2: Target Completion Date and Time of Workflow

Of all the four priority-determining parameters, the significance of workflows is considered in the first place. If two workflows are of the same significance, then their target completion dates and times are evaluated as the next criterion. The target completion date and time of a workflow is specified either as execution time relative to the execution start time of the workflow, or as scheduled end date and time of the workflow.

In operation of the proposed system, workflows are executed under a service level agreement (SLA) with the customers. This is why the execution time of a workflow may be specified as in "the workflow finishes in xx minutes after its start," for example. Execution times of workflows may also be specified for the purpose of monitoring delay of their execution. For example, some workflows are invoked to deal with downtime of a mission-critical business server, and these workflows are supposed to finish within 30 minutes after their start. As another example, the execution of workflows related to a human resources server is supposed to come to an end in three hours after their start.

The execution times of workflows may be determined beforehand as part of their workflow definitions, or may be specified as part of input parameters given when workflows are executed. When both of these two methods are used, the latter one (i.e., input parameters) is taken in preference to the former one.

Some workflows are executed on a regular basis, according to the schedule of date and time of their start and end. The end dates and times are scheduled with consideration of their effect on business activities. Take a regular data backup of a business system, for example. Since business applications have to stop during the backup operation, the backup schedule may define, for example, that the workflow starts at xx:xx after the business hours and ends at yy:yy.

The foregoing execution time of a workflow is defined as "the workflow finishes in xx minutes after its start." This definition may be paraphrased as "the started workflow be finished at hh:mm on the day of yyyy-mm-dd." This form is substantially equivalent to the completion date definition in the foregoing regular schedule for a workflow. Accordingly, the execution time and schedule of a workflow may be treated as indicating the same thing.

Figure 15:
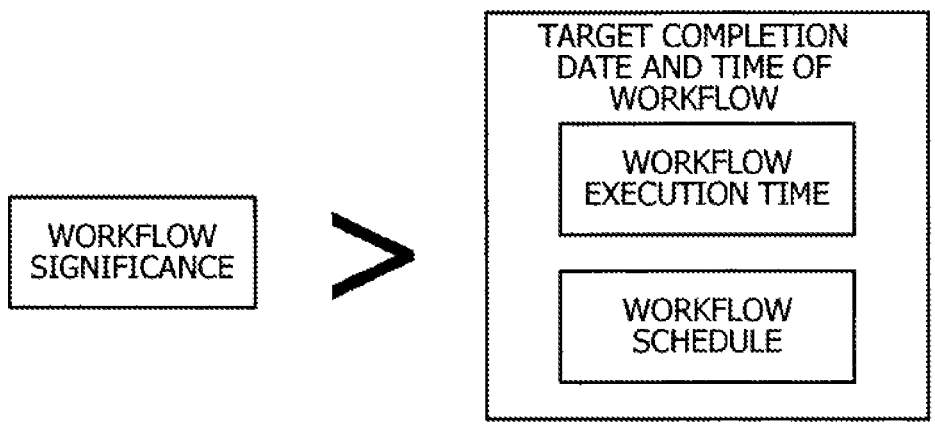
FIG. 15 illustrates a relationship between some priority-determining parameters.

FIG. 15 illustrates a relationship between some priority-determining parameters. Target completion date and time of a workflow is specified as seen in FIG. 15, based on its execution time and schedule. This target completion date and time is used to determine which of two workflows is eligible for a higher priority when these workflows have the same significance. When two workflows are different in significance, their priorities depend only on the significance, regardless of their target completion dates and times.

The execution time and schedule of a workflow are determined depending on the purpose of the workflow. Some class of workflows may therefore have no specified value of target completion date and time. That is, there exist some workflows having neither execution time nor schedule. The lack of parameters indicating target completion date and time means the lack of reasons for having a preference for those workflows over others. That is, workflows with a specified target completion date and time have a higher priority than those with no target completion date and time.

Figure 16:
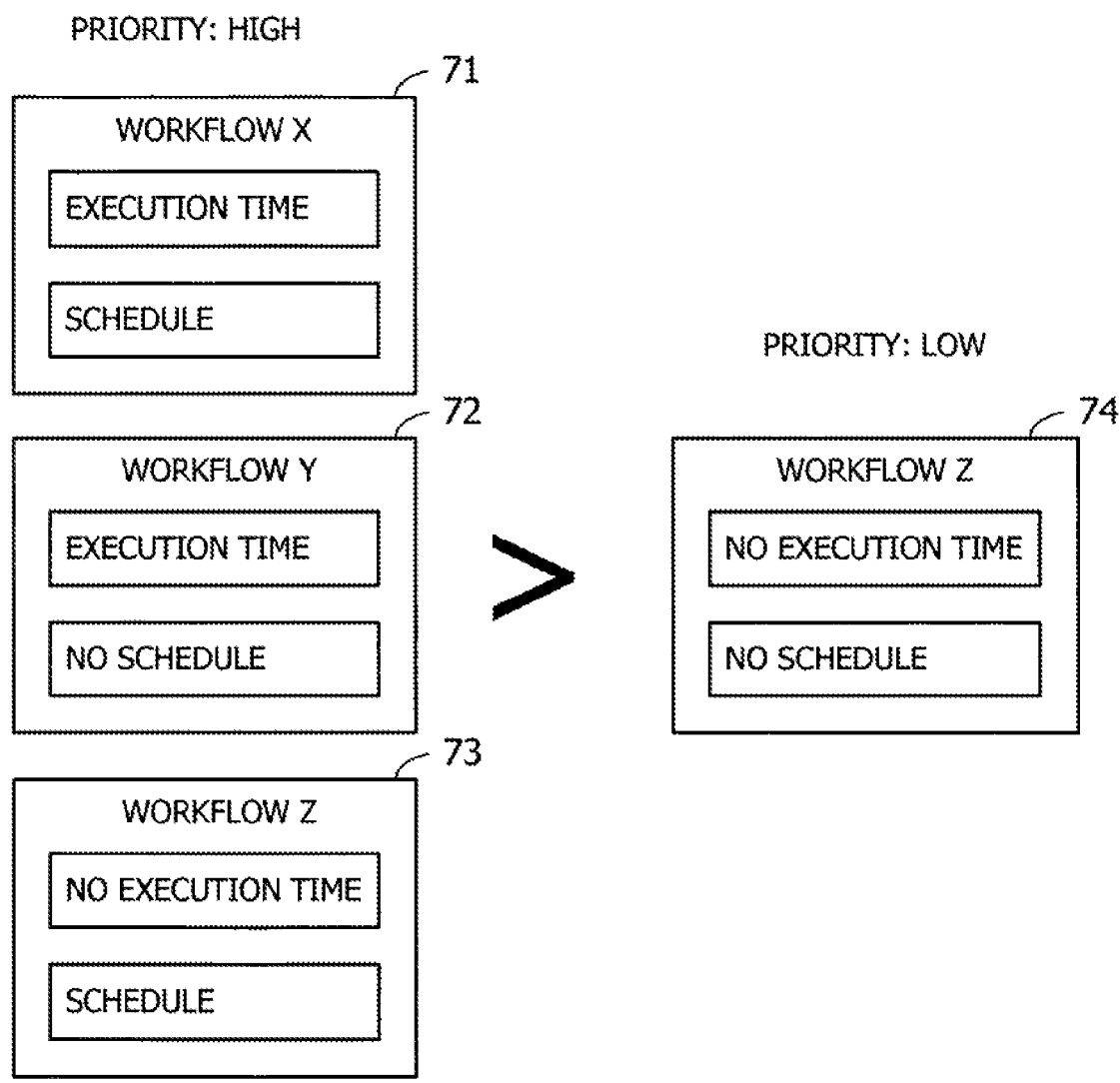
FIG. 16 illustrates how the presence of target completion date and time relates to priority.

FIG. 16 illustrates how the presence of target completion date and time relates to priority. FIG. 16 includes four workflows 71 to 74, of which three workflows 71 to 73 have execution time or schedule or both to specify their end dates and times while the other workflow 74 has none of them. In this case, the former workflows 71 to 73 is prioritized over the latter workflow 74.

Within the group of workflows 71 to 73, workflows having an earlier target completion date and time are given a higher priority. Regarding the workflow 71 having both execution time and schedule, its target completion date and time is determined from either the execution time or the scheduled end date and time, whichever is earlier.

Figure 17:
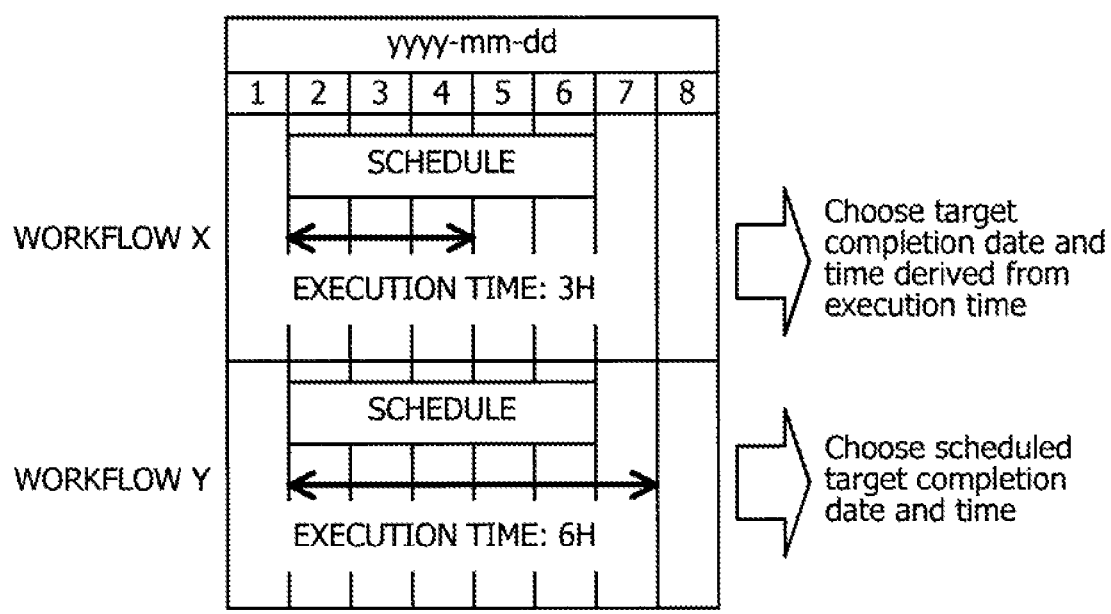
FIG. 17 illustrates an example of how target completion date and time is determined.

FIG. 17 illustrates an example of how target completion date and time is determined. FIG. 17 includes two workflows X and Y. One workflow X is scheduled to start at 02:00 and end at 07:00. Workflow X has a specified execution time of three hours. According to its specified execution time, workflow X will end at 05:00 if it is started at 02:00. This execution time-based target completion date and time (05:00) is earlier than the scheduled target completion date and time (07:00). Accordingly, workflow X is supposed to finish at 05:00 as its execution time implies.

The other workflow Y is scheduled to start at 02:00 and end at 07:00. Workflow Y has a specified execution time of six hours. According to its specified execution time, workflow Y will end at 08:00 if it is started at 02:00. In this case, the scheduled target completion date and time (07:00) is earlier than the execution time-based target completion date and time (08:00). Accordingly, workflow Y is supposed to finish at 07:00 as its schedule indicates.

As can be seen from the above, the communication daemon 160 gives a higher priority to communication requests from more significant workflows. If workflows have the same significance, the communication daemon 160 selects a communication request having an earlier target completion date and time in preference to others having later dates and times.

iii) Parameter 3: The Number of Remaining Human Tasks in Workflow

Some workflows may have the same significance and the same target completion date and time. When this is the case, the priorities of such workflows depend on whether they include human intervention.

Many of actual workflows include intervention of human operation. Suppose, for example, that a workflow definition includes three tasks of (1) issuance of a processing request (e.g., mail notice), (2) physical work (e.g., hardware replacement), and (3) entry of processing result (transition of processing). The second step "physical work" is performed by a human. Workflows including such a human task would take more time than workflows formed only from automatic tasks because the noted human task causes a workflow to suspend until it is finished.

Figure 18:
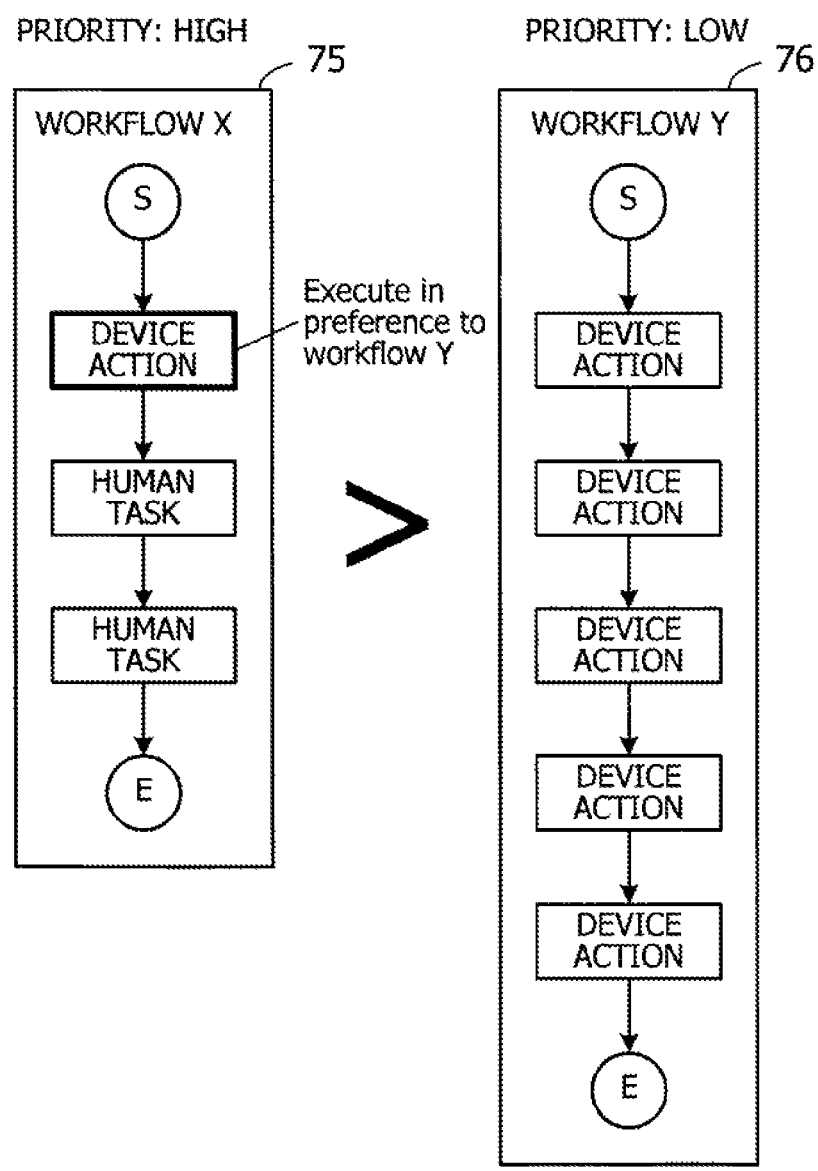
FIG. 18 illustrates how the priority varies depending on the presence of human tasks.

FIG. 18 illustrates how the priority varies depending on the presence of human tasks. In this example of FIG. 18, the left workflow 75 begins with a device action on a certain target device, which is automatically executable with remote control. The same workflow 75 then proceeds to two human tasks. In contrast, the right workflow 76 in FIG. 18 is formed only from automatically executable device actions. Human tasks take more time than automatically executable device actions. This means that the left workflow 75 takes more time than the right workflow 76.

The left workflow 75 in FIG. 18 issues a communication request when it executes the task of the first device action. If the execution of this device action delays, the lag would suspend execution of subsequent human tasks, thus ending up with an additional delay of the time-consuming workflow 75. Accordingly, the communication request for the first device action in the left workflow 75 has to have a higher priority than any communication request that the right workflow 76 issues for its execution.

More specifically, when two workflows have the same significance and the same target completion date and time, the communication daemon 160 calculates the number of human tasks that follow a device action. This number is what has been discussed above as a remaining human task count. The communication daemon 160 then gives a higher priority to the workflow with more remaining human tasks. In other words, this feature of the communication daemon 160 gives weight to quick transition to human tasks. The number of human tasks may vary depending on whether the workflow of interest includes conditional branches, as well as on whether the workflow calls sub-workflows. The second embodiment calculates the maximum number of human tasks at the time when a need for communication arises, and uses that number as a remaining human task count.

Figure 19:
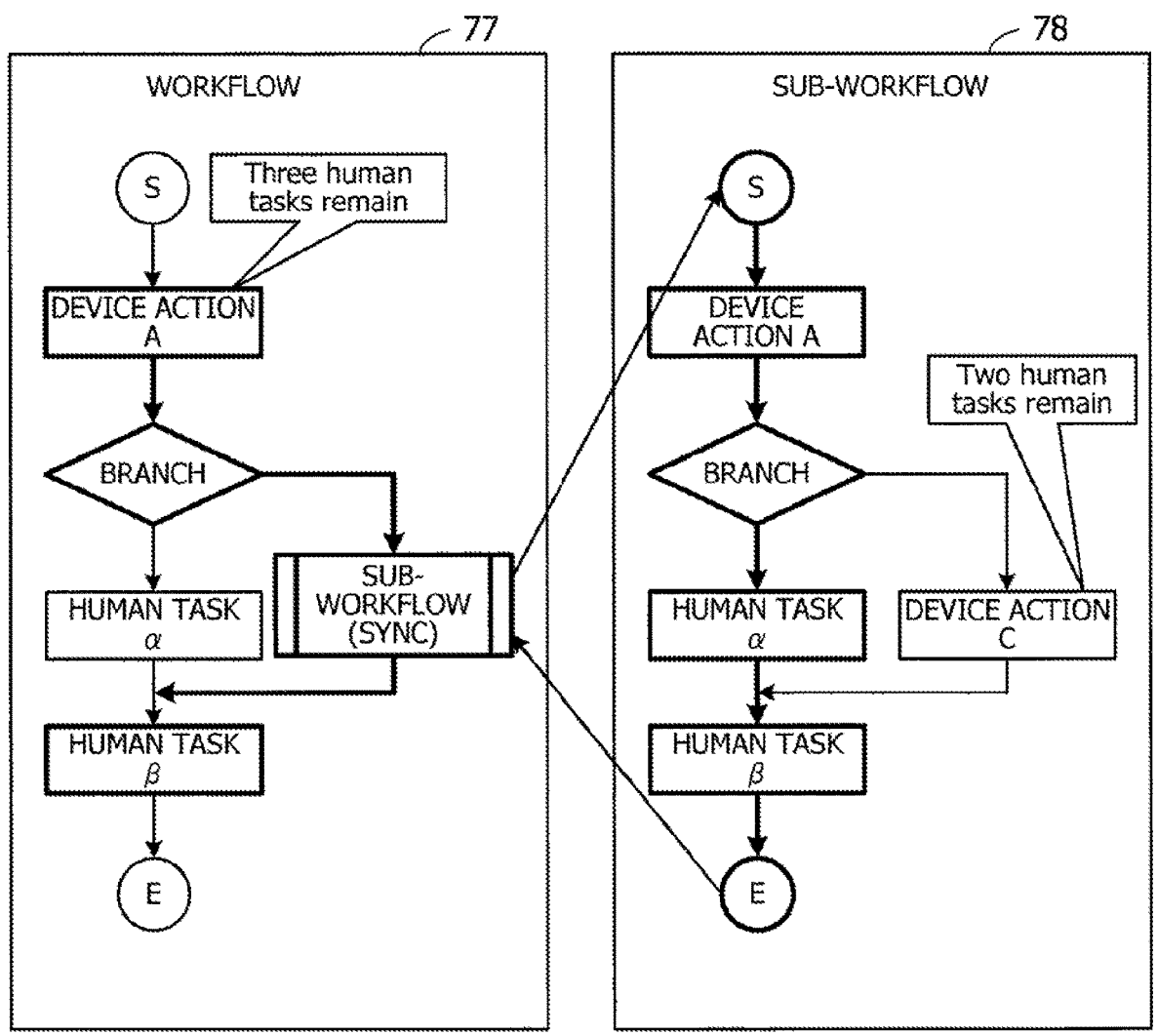
FIG. 19 illustrates an example of how remaining human task counts are calculated.

FIG. 19 illustrates an example of how remaining human task counts are calculated. In the example of FIG. 19, a workflow 77 makes a synchronous call for a sub-workflow 78. This synchronous call causes the sub-workflow to execute its processing tasks, during which the source workflow 77 stands still and waits. Upon completion of the sub-workflow 78, the workflow 77 resumes its remaining tasks.

The workflow 77 executes its first task of device action A. The communication daemon 160 calculates a remaining human task count at this point, taking the internal operations in the sub-workflow 78 into consideration. In the example of FIG. 19, the bold lines and bold symbols indicate one of the possible processing paths. By following this path, the communication daemon 160 obtains a maximum remaining human task count of three. In other words, the remaining human task count has a value of three at the point of device action A.

The processing of the workflow 77 progresses and reaches the task of device action C in its sub-workflow 78. The remaining human task count at this point is calculated only from the rest of the process, i.e., the tasks after device action C. In the example of FIG. 19, the remaining human task count has reduced to two.

Workflows are managed in the format of XML files, for example. XML-based workflows include, for example, Activities tags and Transitions tags. FIG. 20 illustrates an example of information elements defined by Activities tags. Activities tags are used to describe elements that manage automated tasks, branching, and human tasks. The elements of Activities tags are managed by using their respective IDs and names that are locally unique in each workflow. More specifically, Activities tags describe the following things: details of individual tasks, transition ID indicating the destination to go after a task is done, and activity type for distinction between automated task, branching task, and human task. For example, the activity type value of human tasks is "Role."

FIG. 21 illustrates an example of information elements defined by Transitions tags. Transitions tags are used to describe elements that define the destination of a transition. The elements of Transitions tags are managed by using their respective IDs and names that are locally unique in each workflow. More specifically, to define a transition from one activity to another activity, Transitions tags describe an element that includes a source ID and a destination ID indicating the two activities.

The remaining human task count (i.e., the number of unexecuted human tasks counted relative to the current point of activity) is extracted from a workflow written in XML form. This is performed as follows.

For example, the workflow log storage unit 130 is configured to keep track of the current place (activity) in each workflow, together with its status. A remaining human task count is now extracted by counting activities having a value of "Role" in Performer element while following transitions in the workflow definition (XML file) from the current place (activity).

The next section will provide details about the method for calculating a remaining human task count, with reference to a specific workflow in the XML format.

Figure 22:
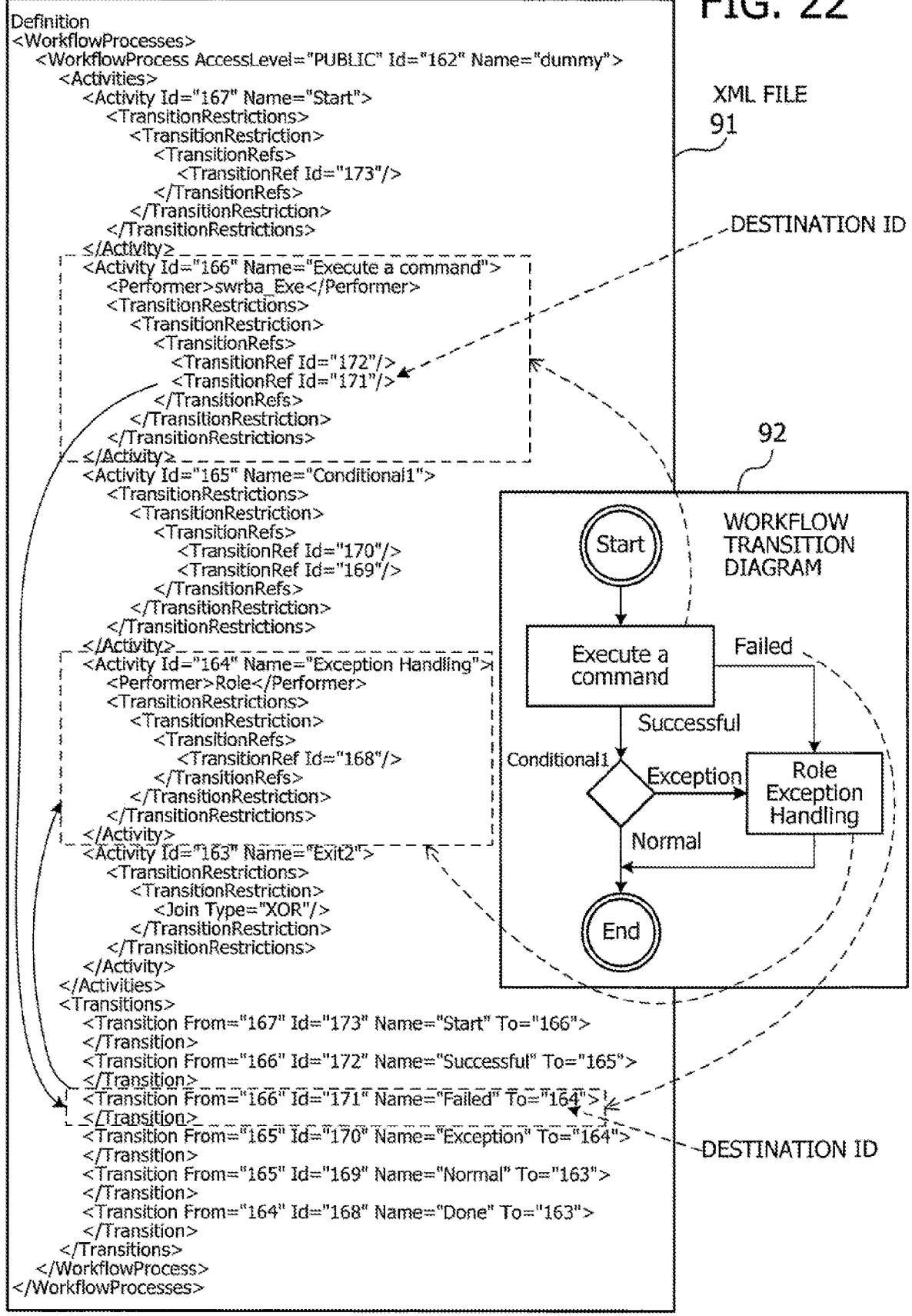
FIG. 22 illustrates an example of how remaining human task counts are calculated.

FIG. 22 illustrates an example of how remaining human task counts are calculated. Specifically, FIG. 22 illustrates an XML file 91 describing a workflow definition, along with a workflow transition diagram 92 representing a procedure according to the workflow definition. Human tasks may be used to, for example, recover from a problem (i.e., exception handling) when some automated task (e.g., execute a command) has failed, or when the control is returned as a result of an abend of the command, so that the task can finish. Assume now that the execution is currently at the activity "Execute a command" with an ID of 166. Here the following gives three possible patterns of transitions:

Pattern 1: ID:166→ID:171→ID:164→ID:168→ID:163
Pattern 2: ID:166→ID:172→ID:165→ID:169→ID:163
Pattern 3: ID:166→ID:172→ID:165→ID:170→ID:164→ID:168→ID:163

The number of human tasks is calculated by counting tasks with a Performer value of "Role" in each route. In the above example of FIG. 22, "ID:164" is the only element representing a human task. Pattern 1 includes one human task. Pattern 2 includes no human tasks. Pattern 3 includes one human task. Accordingly, the remaining human task count in the example of FIG. 22 is one.

iv) Parameter 4: Start Date of Workflow

When workflows have the same significance, the same target completion date and time, and the same remaining human task count, their communication requests are executed, not in the order that they are enqueued into the queue data storage unit 162, but in the order that their corresponding workflows are started. This policy intends that the earlier started workflows will finish earlier to ensure the usability.

Figure 23:
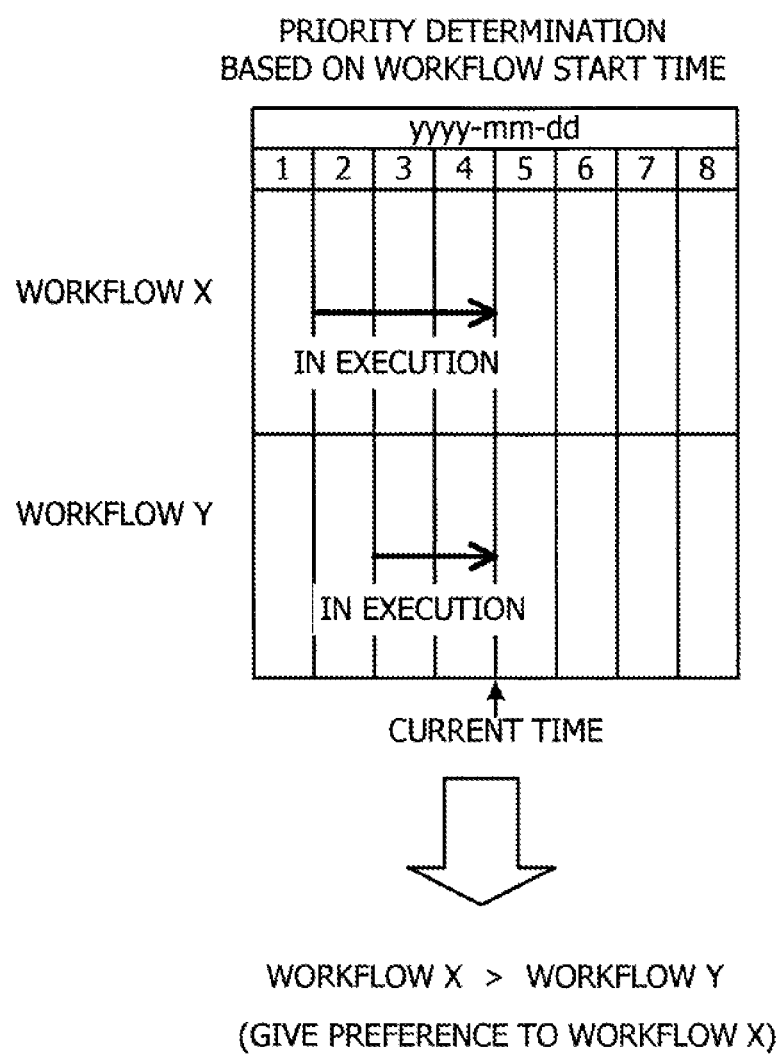
FIG. 23 illustrates how a workflow's start date and time relates to priority.

FIG. 23 illustrates how a workflow's start date and time relates to priority. As seen in the example of FIG. 23, workflow X starts earlier than workflow Y. This means that workflow X has a higher priority than workflow Y.

As can be seen from the above, the priorities of workflows are determined on the basis of significance, target completion date and time, remaining human task count, and start date and time. Priorities of stand-alone workflows has been discussed above. The next section will explain those of sub-workflows.

d2) Priority of Sub-Workflow

A workflow may be a stand-alone workflow or may be organized as a combination of multiple workflows associated by caller-callee relationships. In the latter case, the topmost calling workflow is referred to as the "root workflow," whose priority is determined in a similar way to those of stand-alone workflows.

The root workflow calls up sub-workflows for execution, which include synchronous ones and asynchronous ones. Here, the term "synchronous" means that the calling (i.e., parent) workflow waits for completion of the called sub-workflow. The term "asynchronous" denotes that the calling workflow is allowed to proceed to the next task without waiting for completion of the called sub-workflow. For independent stand-along workflows, the communication daemon 160 determines their priorities on the basis of individual workflow's own parameters. For sub-workflows, the communication daemon 160 also relies upon the priority of their root workflow.

Synchronous Sub-Workflow

If a synchronous sub-workflow took so long time that the execution penetrates into the time frame of its parent workflow, it would be difficult for the parent workflow to keep its target completion date and time. In view of this potential problem, the priority determination for a synchronous sub-workflow uses priority-determining parameters of its parent workflow. The remaining human task count, on the other hand, is calculated each time a new action occurs in a workflow because its value varies depending on the progress of the workflow.

Asynchronous Sub-Workflow

Asynchronous sub-workflows do not need consideration of target completion dates and times of their parent workflows, but they are still a part of their parent workflows. For this reason, the significance is the only parameter that is borrowed from parent workflows by the priority determination process.

Figure 24:
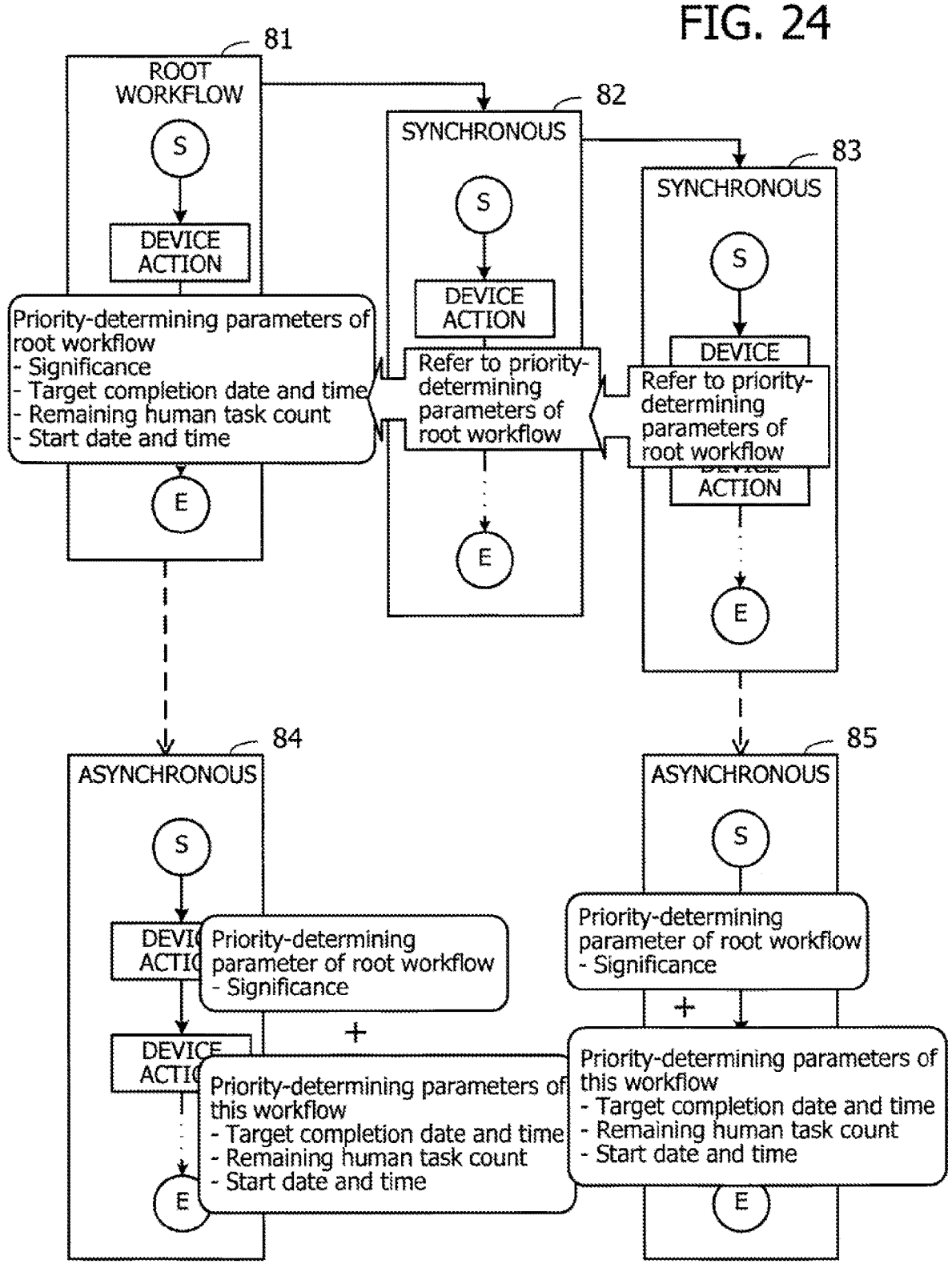
FIG. 24 illustrates an example of parameters used to determine priority of sub-workflows.

FIG. 24 illustrates an example of parameters used to determine priority of sub-workflows. In this example, the illustrated root workflow 81 calls a synchronous sub-workflow 82 and an asynchronous sub-workflow 84. The called sub-workflow 82 calls a synchronous sub-workflow 83, and that sub-workflow 83 calls an asynchronous sub-workflow 85.

In the illustrated case of FIG. 24, the priority determination process for synchronous sub-workflows 82 and borrows every parameter (i.e., significance, target completion date and time, remaining human task count, and start date and time) from the root workflow 81. That is, the priority of sub-workflows 82 and 83 is determined based on the priority-determining parameters of their root workflow 81.

In contrast, the priority determination process for an asynchronous sub-workflow 84 refers to the significance of the root workflow 81 and the target completion date and time, remaining human task count, and start date and time of the sub-workflow 84 itself. Likewise, the priority determination process for another asynchronous sub-workflow 85 refers to the significance of the root workflow 81 and the target completion date and time, remaining human task count, and start date and time of the sub-workflow 85 itself.

Actually, the synchronous sub-workflows 82 and 83 themselves are ordinary workflows and may thus have their own execution time parameters. These synchronous sub-workflows 82 and 83 have to finish before the target completion date and time that the root workflow 81 is supposed to keep. The noted execution time parameters would help the sub-workflows 82 and 83 to fulfill this condition. Many of the cases, however, do not call for such strict management. Accordingly, the communication daemon 160 disregards execution time parameters of sub-workflows 82 and 83 when determining their priorities. That is, the communication daemon 160 refers only to the root workflow's target completion time.

In the case where a newly created workflow calls some existing workflow as a synchronous sub-workflow, the calling new workflow may, however, have a shorter execution time than the execution time of the called sub-workflow. The communication daemon 160 compares in this case the target completion date and time specified by the calling workflow with the end date and time derived from the execution time of the called synchronous sub-workflow and chooses an earlier one of them for use in determining priority of the sub-workflow.

Figure 25:
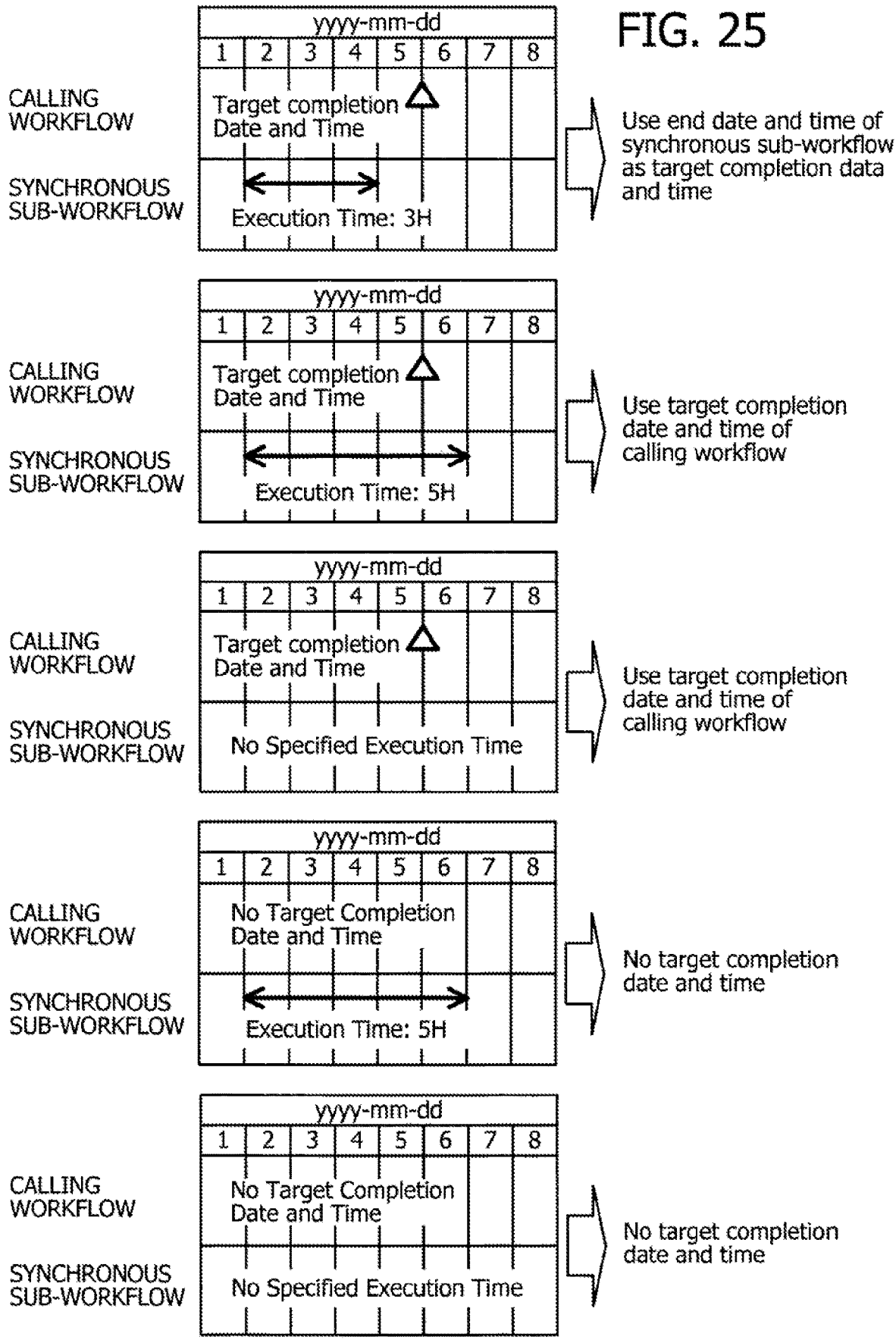
FIG. 25 illustrates how target completion date and time of a calling workflow relates to execution time of a synchronous sub-workflow.

FIG. 25 illustrates how the target completion date and time of a calling workflow relates to execution time of a synchronous sub-workflow. Referring to the topmost example seen in FIG. 25, the end date and time of the synchronous sub-workflow based on its execution time comes earlier than the calling workflow's target completion date and time. In this case, the communication daemon 160 chooses the end date and time of the synchronous sub-workflow as the target completion date and time of the same.

Referring to the second to the topmost example, the end date and time of the synchronous sub-workflow comes later than the calling workflow's target completion date and time. In this case, the communication daemon 160 chooses the target completion date and time of the calling workflow as the synchronous sub-workflow's target completion date and time.

Referring to the third example, the synchronous sub-workflow has no specified execution time parameter, whereas the calling workflow has its target completion date and time. In this case, the communication daemon 160 chooses the target completion date and time of the calling workflow as the synchronous sub-workflow's target completion date and time.

Referring to the fourth example, the calling workflow has no specified target completion date and time, whereas the synchronous sub-workflow has its execution time parameter. In this case, the communication daemon 160 accepts the fact that the calling workflow has no target completion date and time.

Referring to the fifth example, the calling workflow has no specified target completion date and time, and the synchronous sub-workflow has no specified execution time parameter. In this case, the communication daemon 160 accepts the fact that the calling workflow has no target completion date and time.

As can be seen from the above, the communication daemon 160 is configured to use different priority-determining parameters for stand-alone workflows, synchronous sub-workflows, and asynchronous sub-workflows, taking their characteristics into consideration. In this connection, the priority of the root workflow is determined from the same parameters used for stand-alone workflows.

Figure 26:
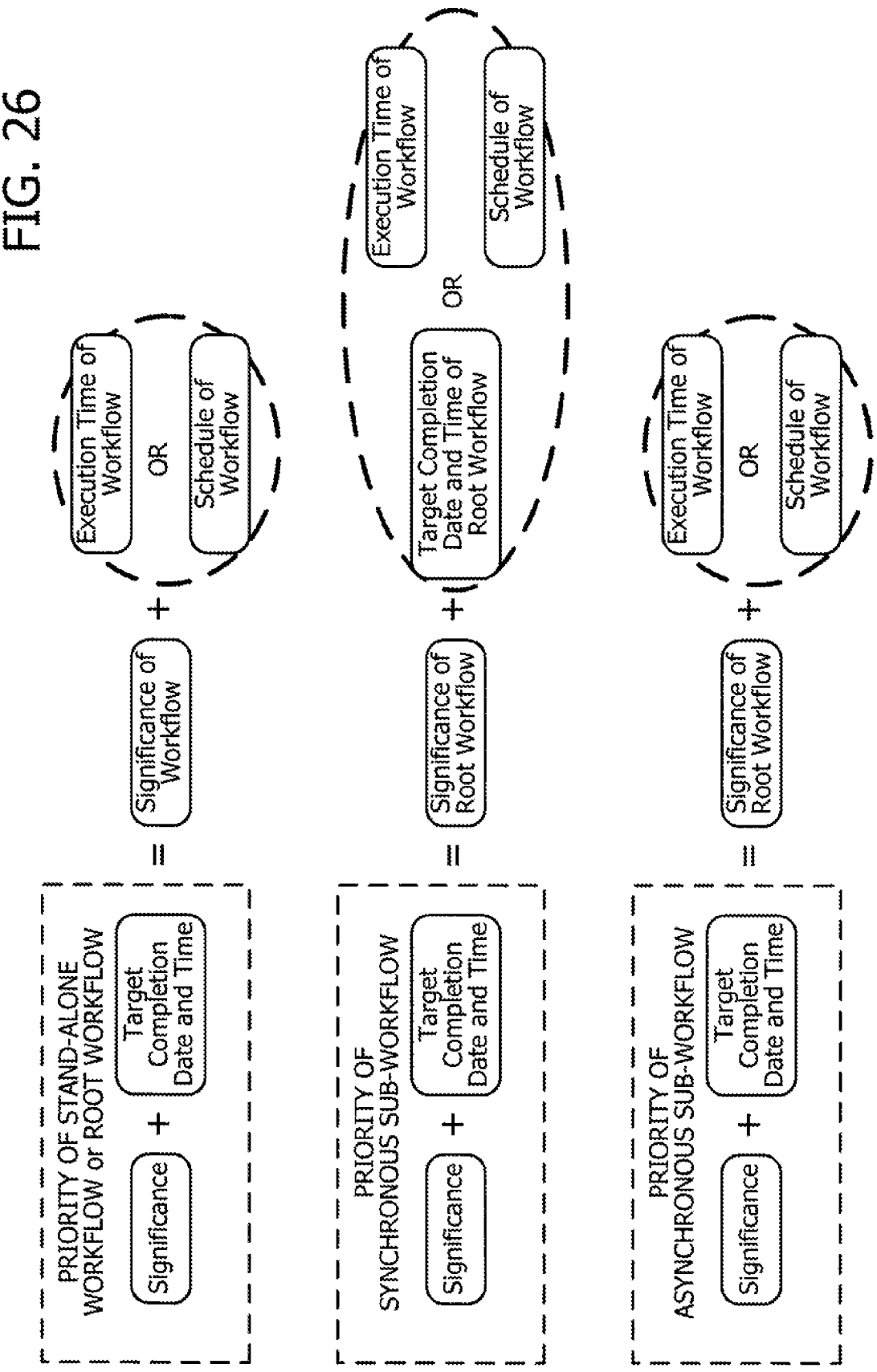
FIG. 26 illustrates an example of different priority-determining parameters used for different types of workflows.

FIG. 26 illustrates an example of different priority-determining parameters used for different types of workflows. Note that FIG. 26 only demonstrates significance and target completion date and time for simplicity purposes, while omitting remaining human task count and start date and time.

For example, the communication daemon 160 uses a workflow's own significance as a priority-determine parameter when the workflow in question is a stand-alone workflow or root workflow. What is used as a target completion date and time is the end date and time of the workflow that is derived from its execution time or specified in its schedule.

When the workflow of interest is a synchronous sub-workflow, the communication daemon 160 uses the significance of its root workflow. With respect to target completion date and time, the communication daemon 160 chooses one of the following three options: the root workflow's target completion date and time, the end date and time derived from execution time of the workflow of interest, and the end date and time specified in the workflow's own schedule.

When the workflow of interest is an asynchronous sub-workflow, the communication daemon 160 uses the significance of the root workflow. With respect to target completion date and time, the communication daemon 160 chooses either the end date and time derived from execution time of the workflow of interest or the end date and time specified in the workflow's own schedule.

(e) Workflow Execution Procedure

This section specifically describes procedures that the workflow execution server 100 performs when executing a workflow. For example, a workflow is initiated when an execution request for the workflow arrives at the workflow control unit 150 from the web/AP server 41. As another example, a workflow is initiated when its start date and time scheduled in the schedule definition storage unit 120 is reached. The workflow control unit 150 then creates a workflow execution process, which generates priority data (e.g., significance, target completion date and time) of the workflow in preparation for a subsequent communication session.

Figure 27:
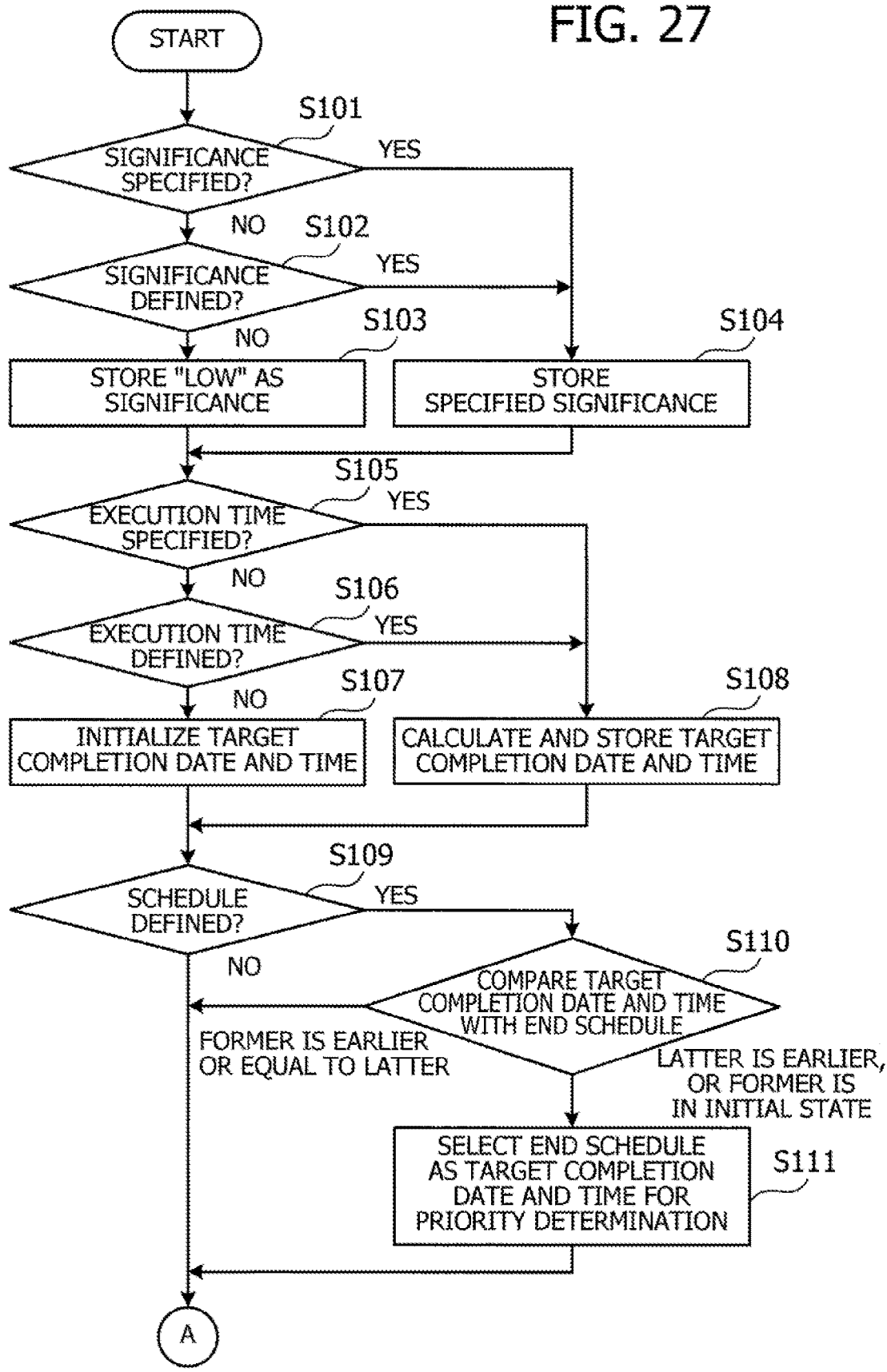
FIGS. 27 and 28 provide a flowchart illustrating an exemplary process of priority data generation.
Figure 28:
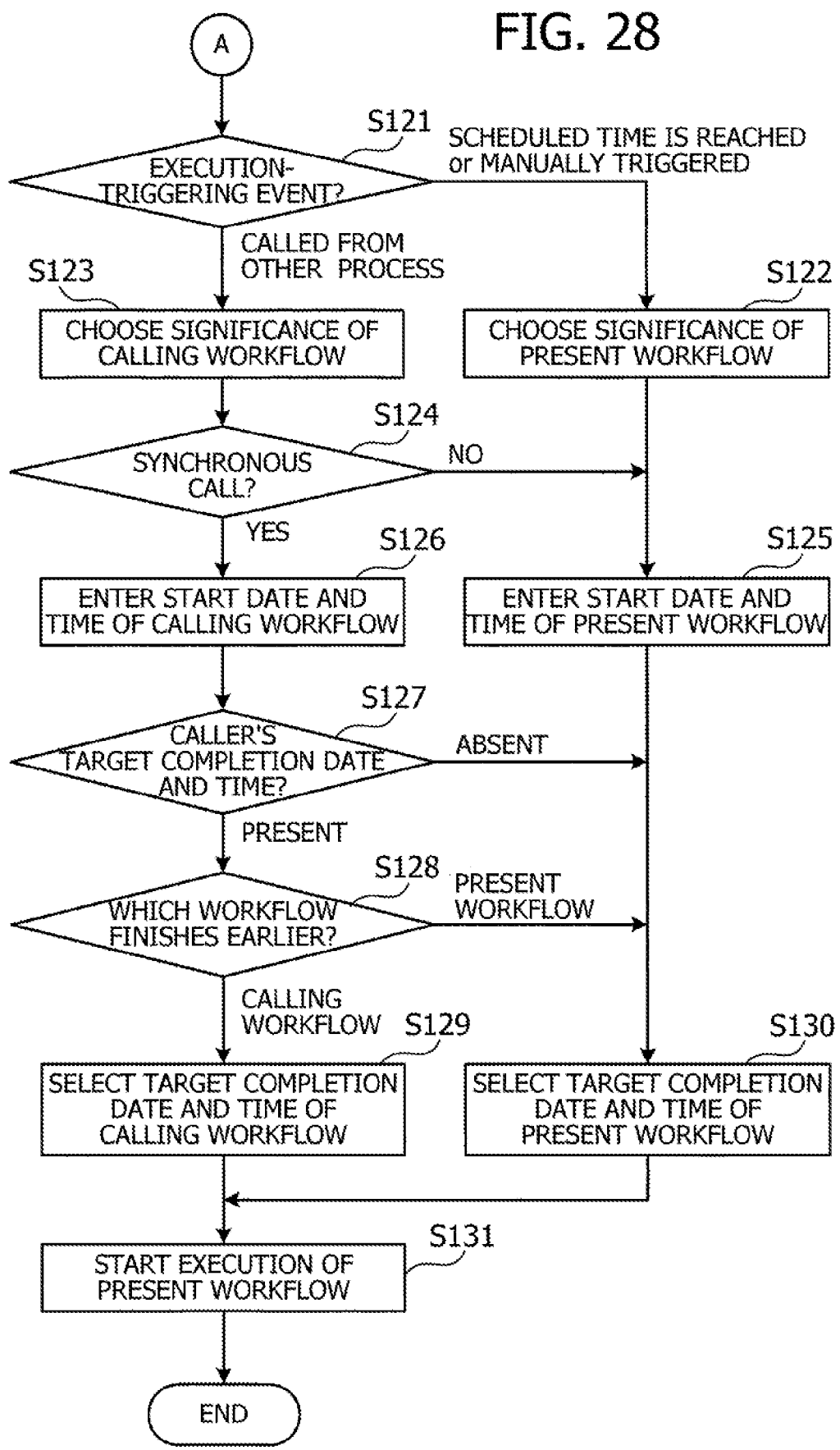

With reference to FIGS. 27 and 28, the description will now provide details of a priority data generation process, assuming that the foregoing workflow execution process 151 in FIG. 4 executes it.

FIG. 27 is the first half of a flowchart illustrating a priority data generation process. Note that FIG. 27 illustrates part of the process that relates only to the priority-determining parameters given to the workflow itself. Each operation in FIG. 27 is described below in the order of step numbers.

(Step S101) The workflow execution process 151 determines whether the received execution request specifies significance of the requested workflow. When the execution request specifies significance, the process proceeds to step S104. When no significance is specified, the process advances to step S102.

(Step S102) The workflow execution process 151 determines whether the requested workflow has a previously defined value of significance. For example, the workflow execution process 151 searches the workflow definition storage unit 110 to find a significance value of the workflow of interest in its corresponding workflow dataset. If such a value is defined in the workflow dataset, the process proceeds to step S104. If no significance is defined, the process advances to step S103.

(Step S103) The workflow execution process 151 stores a value of "Low" into a memory to indicate the lowest level of significance as priority data for the workflow of interest. The process then advances to step S105.

(Step S104) The workflow execution process 151 stores the specified significance, either the one included in the execution request or the one defined in the workflow dataset, into a memory to indicate the level of significance as priority data for the workflow of interest.

(Step S105) The workflow execution process 151 determines whether the execution request specifies execution time. When execution time is specified, the process proceeds to step S108. When no execution time is specified, the process advances to step S106.

(Step S106) The workflow execution process 151 determines whether the requested workflow has a previously defined value of execution time. For example, the workflow execution process 151 searches the workflow definition storage unit 110 to find an execution time value of the workflow of interest in its corresponding workflow dataset. When such a value is defined in the workflow dataset, the process proceeds to step S108. When there is no execution time definition, the process advances to step S107.

(Step S107) The workflow execution process 151 initializes the target completion date and time in priority data for the workflow of interest and stores it (i.e., null data) into a memory. The process then advances to step S109.

(Step S108) The workflow execution process 151 calculates a target completion date and time on the basis of execution time that is included in the received execution request or predefined in a pertaining workflow dataset. For example, the workflow execution process 151 adds the noted execution time to execution start date and time of the workflow and setting the resulting sum as a target completion date and time. Then the workflow execution process 151 stores the calculated target completion date and time into a memory as part of the priority data of the workflow.

(Step S109) The workflow execution process 151 determines whether the workflow of interest has its schedule definition. For example, the workflow execution process 151 searches the schedule definition storage unit 120 for priority data including a schedule management dataset with the workflow ID of the workflow of interest. If such priority data is found, it means the presence of a schedule definition for the workflow, and the process advances to step S110. Otherwise, the process goes to step S121 (see FIG. 28).

(Step S110) The workflow execution process 151 compares the target completion date and time at present with the scheduled end date and time (end schedule). If the target completion date and time is earlier or if the two times are equal, the process goes to step S121. If the end schedule is earlier or if the target completion date and time is in initial state, the process advances to step S111.

(Step S111) The workflow execution process 151 selects the end schedule as target completion date and time for the priority data of the workflow of interest. The process then goes to step S121.

The above steps in FIG. 27 select priority data for each workflow when it is a stand-alone workflow. Some workflows may, however, be sub-workflows called by some other workflow. As discussed previously in FIG. 24, a part or whole of priority data of the calling workflow is referenced in priority determination of sub-workflows. The workflow execution process 151 thus obtains final priority data of a workflow by changing parameter values indicated in the original priority data, depending on execution-triggering events of the workflow.

Now with reference to FIG. 28, the following will describe, as part of the priority data generation process, a process of changing priority data on the basis of execution-triggering events.

FIG. 28 is the second half of the flowchart illustrating the priority data generation process. Specifically, FIG. 28 explains how the priority data is changed on the basis of execution-triggering events. Each operation in FIG. 28 is described below in the order of step numbers.

(Step S121) The workflow execution process 151 determines what event is currently calling for execution of a workflow. One example of execution-triggering event is detection of a scheduled start date and time. Another example is arrival of an execution request from the web/AP server 41 in response to a manual command. In these cases, the process advances to step S122. Yet another example of execution-triggering event is a call from some other workflow execution process. In this case, the process advances to step S123.

(Step S122) The workflow execution process 151 determines to use significance of its own workflow (i.e., the present workflow to be executed) without changing that value in the pertaining priority data. The process then advances to step S125.

(Step S123) The workflow execution process 151 determines to use significance of the calling workflow in place of significance of the present workflow. That is, the workflow execution process 151 changes the priority data for the present workflow by replacing the original significance value with that of the calling workflow.

(Step S124) The workflow execution process 151 determines whether the call is synchronous or asynchronous. When it is a synchronous call, the process advances to step S126. When it is an asynchronous call, the process proceeds to step S125.

(Step S125) The workflow execution process 151 enters start date and time of the present workflow into its pertaining priority data. The process then advances to step S130.

(Step S126) The workflow execution process 151 enters start date and time of the calling workflow into the priority data for the present workflow.

(Step S127) The workflow execution process 151 determines whether the calling workflow has its target completion date and time. If the calling workflow has it, the process advances to step S128. If not, the process goes to step S130.

(Step S128) The workflow execution process 151 compares the target completion date and time of the calling workflow with that of the present workflow. If the target completion date and time of the calling workflow is earlier than that of the present workflow, the process advances to step S129. If the target completion date and time of the present workflow is earlier than that of the calling workflow, the process goes to step S130.

(Step S129) The workflow execution process 151 selects the target completion date and time of the calling workflow for use with the priority data pertaining to the present workflow. That is, the workflow execution process 151 changes the priority data for the present workflow by replacing the original value of target completion date and time with the target completion date and time of the calling workflow. The process then advances to step S131.

(Step S130) The workflow execution process 151 selects the target completion date and time of the present workflow. The workflow execution process 151 maintains the original value of target completion date and time in the priority data for the present workflow.

(Step S131) The workflow execution process 151 executes tasks according to the present workflow.

As can be seen from the above, the workflow execution process 151, when activated, makes preparations for an upcoming communication session by generating priority data for a workflow to be executed. When the workflow has reached a task of manipulating a specific target device, the workflow execution process 151 invokes a device action control process. This device action control process causes the workflow execution process 151 to extract remaining human task count as part of the priority data and delegate execution of the task by sending a communication request to the communication daemon 160. This communication request includes connection parameters for the target device, priority data, workflow dataset, and the like.

Figure 29:
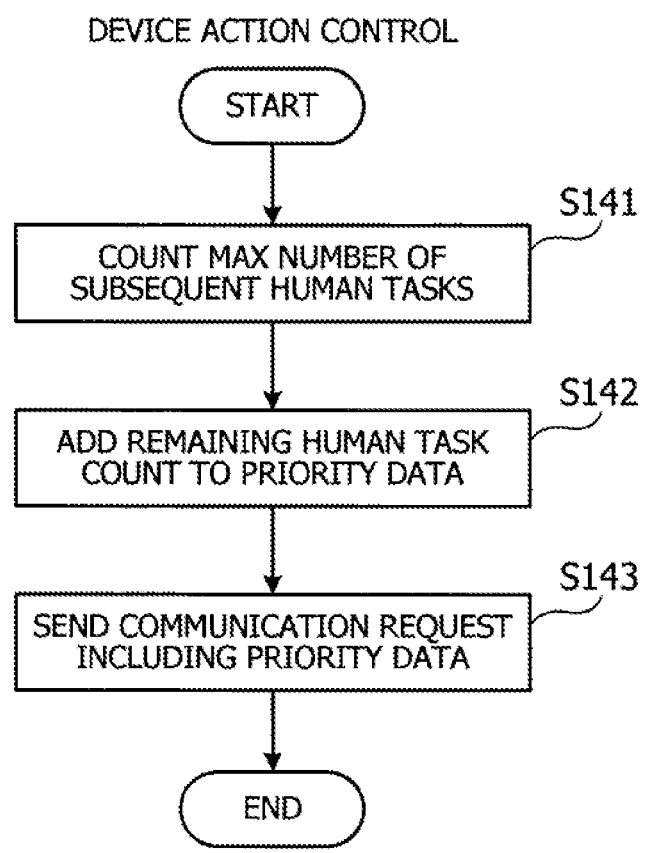
FIG. 29 is a flowchart illustrating an exemplary process of device action control.

FIG. 29 is a flowchart illustrating an exemplary process of device action control. Each operation in FIG. 29 is described below in the order of step numbers.

(Step S141) The workflow execution process 151 counts the maximum number of human tasks subsequent to the current task. The workflow execution process 151 refers to the resulting count value as the remaining human task count.

(Step S142) The workflow execution process 151 adds the remaining human task count to the pertaining priority data.

(Step S143) The workflow execution process 151 sends a communication request to the communication daemon 160. This communication request carries the above priority data.

The workflow execution process 151 then receives a response carrying a result of the communication request, which permits the workflow to advance to the next task. When the next task is a human task, the workflow execution process 151 waits for a notice of its completion, while suspending progress of the workflow.

Figure 30:
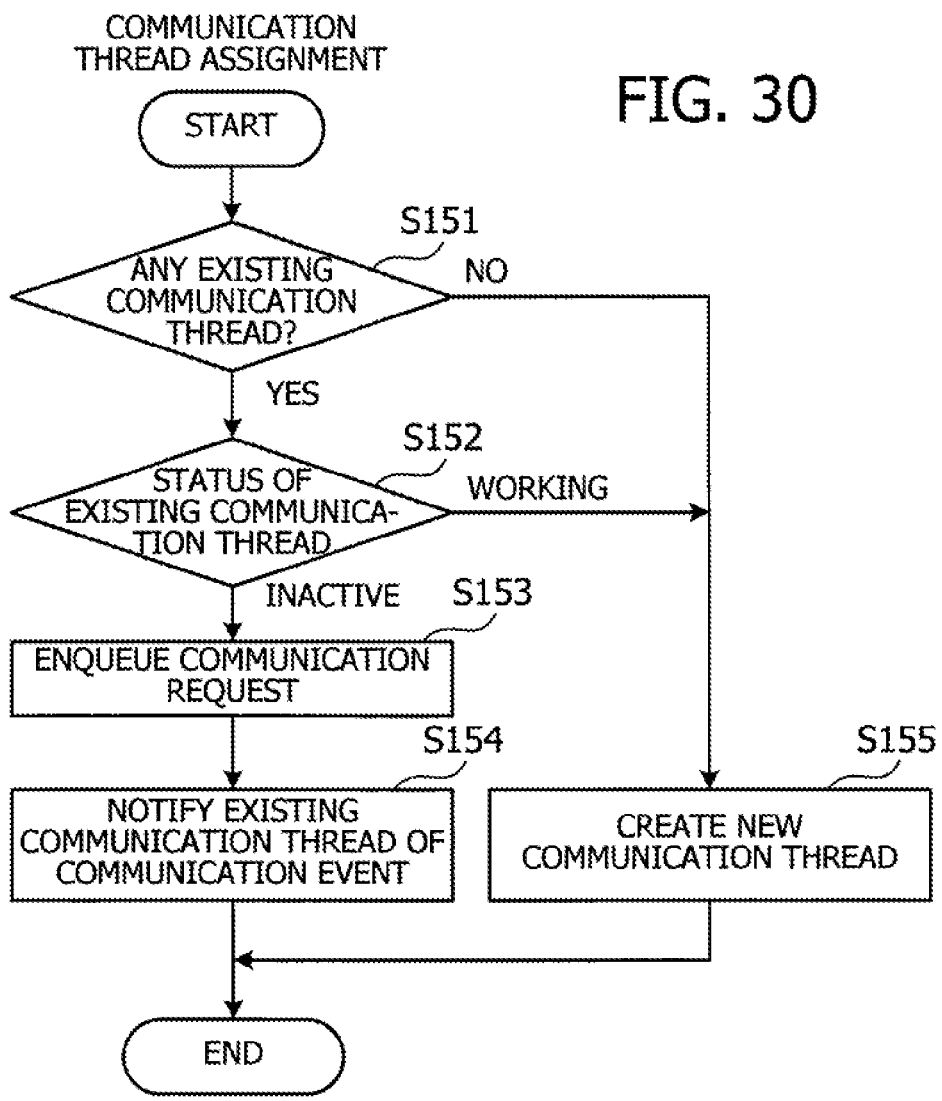
FIG. 30 is a flowchart illustrating an exemplary process of assigning communication threads.

The description now turns to a request reception unit 161 in the communication daemon 160. Upon receipt of a communication request, this request reception unit 161 assigns a communication thread to process the received request. FIG. 30 is a flowchart illustrating an exemplary process of assigning communication threads. Each operation in FIG. 30 is described below in the order of step numbers.

(Step S151) The request reception unit 161 determines whether there is any relevant existing communication thread having a connection with the requested target device. This communication thread has also to use the same connection method as the communication request specifies. If such a communication thread exists, the process advances to step S152. If no relevant communication thread exists, the process branches to step S155.

(Step S152) The request reception unit 161 checks the current status of the existing communication thread found in step S151. When the communication thread is working, the process proceeds to step S155. When the communication thread is stopped, the process advances to step S153.

(Step S153) The request reception unit 161 stores a record of the received communication request into the queue data storage unit 162. Such records are referred to as "queue data."

(Step S154) The request reception unit 161 notifies the existing communication thread found in step S151 of a communication event. This communication event initiates execution of a communication request stored in the queue data storage unit 162. The present process of communication thread is then closed.

(Step S155) The request reception unit 161 creates a new communication thread. Then the request reception unit 161 notifies the created communication thread of a communication event that requests execution of a communication request. The request reception unit 161 at this point requests the supervisory thread 163 to watch the workflow running under the source workflow execution process that has sent the communication request. The supervisory thread 163 thus starts to watch the specified workflow.

The request reception unit 161 operates in the way described above to assign an existing or new communication thread to a received communication request and request it to execute the communication request. The communication thread executes the specified communication request accordingly. The next section will describe in detail what is performed by a communication thread 164 (see FIG. 4) upon receipt of a communication request.

Figure 31:
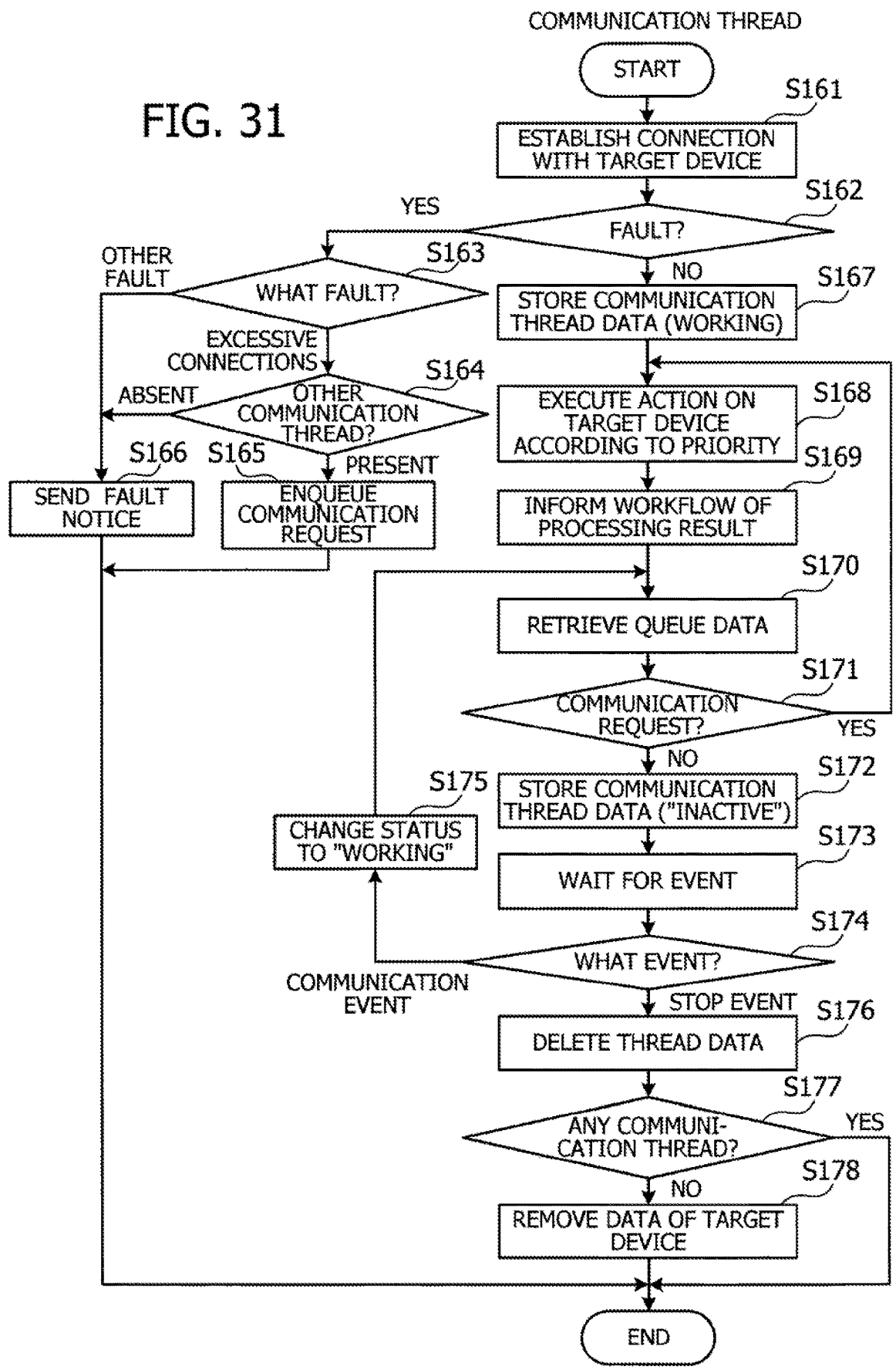
FIG. 31 is a flowchart illustrating a procedure that a communication thread performs.

FIG. 31 is a flowchart illustrating a procedure that a communication thread performs. Each operation in FIG. 31 is described below in the order of step numbers.

(Step S161) Newly invoked by a processing request, the communication thread 164 establishes a connection with a target device that the processing request specifies as the destination of a communication request.

(Step S162) The communication thread 164 determines whether there is any communication fault. When a communication fault is found, the process branches to step S163. When a connection is established as intended, the process advances to step S167.

(Step S163) The communication thread 164 investigates what communication fault has occurred. For example, this information may be provided from the target device. When the fault indicates excessive connections for the target device, the process advances to step S164. In the case of other types, the process proceeds to step S166.

(Step S164) The communication thread 164 determines whether there is any relevant existing communication thread that has a connection with the requested target device, using the same connection method as the communication request specifies. If such a communication thread exists, the process advances to step S165. If no relevant communication thread exists, the process branches to step S166.

(Step S165) The communication thread 164 stores a record of the communication request into the queue data storage unit 162 as queue data. The processing by the communication thread 164 now comes to an end.

(Step S166) The communication thread 164 sends a communication fault notice to the source workflow execution process of the communication request. The processing by the communication thread 164 now comes to an end.

As can be seen from the above, when a communication fault is detected, the communication thread 164 terminates its processing without queuing a received communication request, after notifying a relevant workflow execution process of the communication fault, in the case where there is no existing communication thread for the requested target device, or in the case where the communication fault is other than excessive connections.

(Step S167) Now that a connection has been successfully established, the communication thread 164 registers its own information in the communication thread data storage unit 140. More specifically, the foregoing thread data management table 142 receives a record describing the communication thread 164, including a status value of "Working."

(Step S168) The communication thread 164 executes actions on the connected target device as specified by the communication request. For example, the communication thread 164 may enter remote control commands to the target device, so as to modify some environmental setup for the target device, or to update some programs in the target device. The communication thread 164 may execute pending communication requests in the queue data storage unit 162. In that case, the communication thread 164 selects requests in descending order of workflow priorities.

(Step S169) The communication thread 164 informs the workflow execution process of an execution result.

(Step S170) The communication thread 164 retrieves queue data out of the queue data storage unit 162.

(Step S171) The communication thread 164 determines whether the registered queue data includes communication requests that are supposed to be executed by the communication thread 164 itself. If such relevant communication requests are found, the communication thread 164 selects one request received from a highest-priority workflow and goes back to step S168. If no relevant communication request is found, the process advances to step S172.

(Step S172) The communication thread 164 changes its communication thread data by entering a status value of "Inactive" to the record describing the communication thread 164.

(Step S173) The communication thread 164 waits for a communication event or a stop event. When the communication thread 164 receives a notice of either event, the process advances to step S174.

(Step S174) The communication thread 164 determines whether the received notice indicates a communication event or a stop event. In the case of a communication event, the process advances to step S175. In the case of a stop event, the process advances to step S176.

(Step S175) The communication thread 164 updates its own record in the communication thread data storage unit 140 by changing the status value to "Working." The process then goes back to step S170.

(Step S176) The communication thread 164 deletes its own record from the communication thread data storage unit 140. The communication thread 164 also disconnects the connection with its pertaining target device.

(Step S177) With reference to the communication thread data storage unit 140, the communication thread 164 counts the number of communication threads connected to the same target device as the communication thread 164. The communication thread 164 determines whether the number has decreased to zero. More specifically, the communication thread 164 searches the thread data management table 142 stored in the communication thread data storage unit 140 for records having a target device ID of the target device to which the communication thread 164 was once connected. If this search ends up with no hits, it means that the number of relevant communication threads is zero, thus permitting the process to advance to step S178. The present process is closed if the search has discovered one or more relevant communication threads.

(Step S178) The communication thread 164 removes, from the communication thread data storage unit 140, data about the target device to which the communication thread 164 is connected. For example, the communication thread 164 updates the target device management table 141 by deleting a record having the target ID of the above-noted target device. The present process is then closed.

In this way, the communication thread 164 executes communication requests in descending order of priorities of their source workflows. The stop event discussed in steps S173 and S174 is an event notified of by the supervisory thread 163. The supervisory thread 163 keeps track of the execution of workflows, as well as of the usage of communication threads, and generates a stop event when the number of existing communication threads is found excessive.

Figure 32:
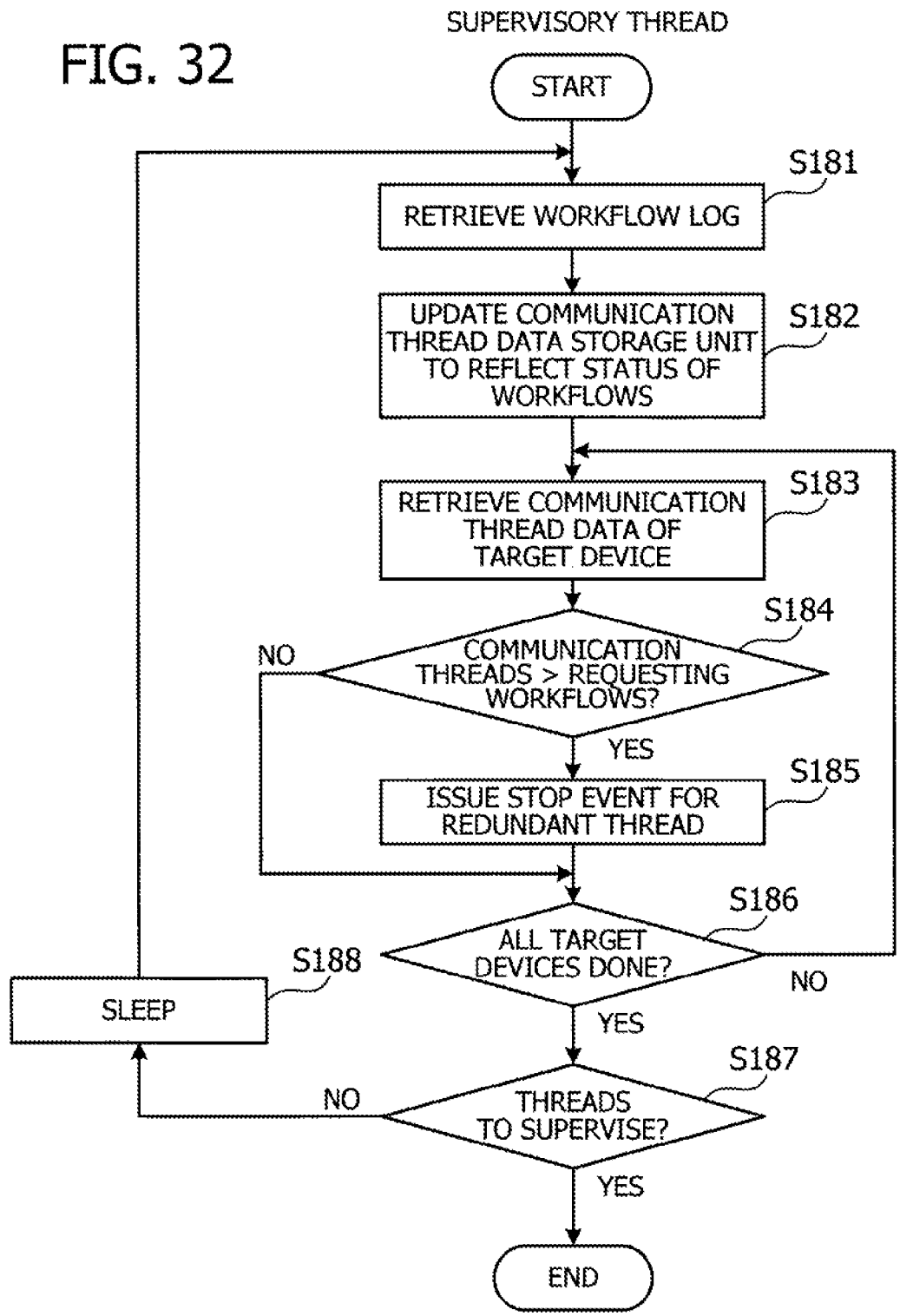
FIG. 32 is a flowchart illustrating an exemplary procedure that a supervisory thread performs.

FIG. 32 is a flowchart illustrating an exemplary procedure that a supervisory thread performs. Each operation in FIG. 32 is described below in the order of step numbers.

(Step S181) The supervisory thread 163 retrieves workflow logs from the workflow log storage unit 130.

(Step S182) The supervisory thread 163 updates records in the communication thread data storage unit 140 to reflect the current working status of workflows. For example, the supervisory thread 163 enters a record to the requesting workflow management table 143, the record including a workflow ID of a working workflow and a target device ID of a target device that is specified in a communication request issued for execution of that workflow. The supervisory thread 163 also locates a workflow in "Stopped" state and removes the record from the requesting workflow management table 143 by using its workflow ID.

(Step S183) The supervisory thread 163 selects one unprocessed target device and retrieves, from the communication thread data storage unit 140, communication thread data associated with the target device ID of the selected target device.

(Step S184) The supervisory thread 163 compares the number of communication threads connected to the selected target device with the number of requesting workflows that have generated communication requests specifying the selected target device. If the communication threads outnumber the requesting workflows, the process advances to step S185. If the two numbers are equal, or if the requesting workflows outnumber the communication threads, the process skips to step S186.

(Step S185) The supervisory thread 163 issues a stop event to redundant communication threads. For example, the supervisory thread 163 first calculates the number of redundant communication threads by subtracting the number of requesting workflows from the number of existing communication threads. The supervisory thread 163 now turns to the thread data management table 142 and extracts records having a status value of "Stopped," out of those associated with target device IDs of target devices where a redundant communication thread is present. Then the supervisory thread 163 selects as many extracted records as the number of redundant communication threads and issues a stop event to communication threads corresponding to thread IDs indicated in the selected records. These communication threads stop their operation in response to this stop event.

(Step S186) The supervisory thread 163 determines whether all target devices have been subjected to the processing of steps S183 to S185. If all target device are done, the process advances to step S187. If there is any pending target device, the process returns to step S183.

(Step S187) The supervisory thread 163 determines whether there is any communication thread to supervise. For example, the supervisory thread 163 detects extinction of communication threads when it is unable to find data about communication threads in the communication thread data storage unit 140. The supervisory thread 163 then terminates its operation. When at least one communication thread remains, the process advances to S188 to continue supervisory activities.

(Step S188) The supervisory thread 163 returns to step S181 after sleeping for a specified time.

The supervisory thread 163 regularly checks the presence of redundant communication threads in this way and stops such communication threads if any.

(f) Advantages of Second Embodiment

As described above, the second embodiment determines the priority of workflows on the basis of their remaining human task counts. This feature enables executing a communication from a workflow with many remaining human tasks in preference to those from other workflows. Consequently, earlier completion of workflows as a whole is achieved when they are executed in parallel.

Workflows have different component combinations; some have many human tasks and others have few human tasks. Without consideration of such differences, a workflow with few human tasks could be executed earlier than a workflow with many human tasks. This would prevent efficient execution control of workflows, such as running a workflow during a wait period of another workflow (e.g., waiting for completion of an ongoing human task). As a result, the parallel execution of multiple workflows would experience a prominent delay.

Figure 33:
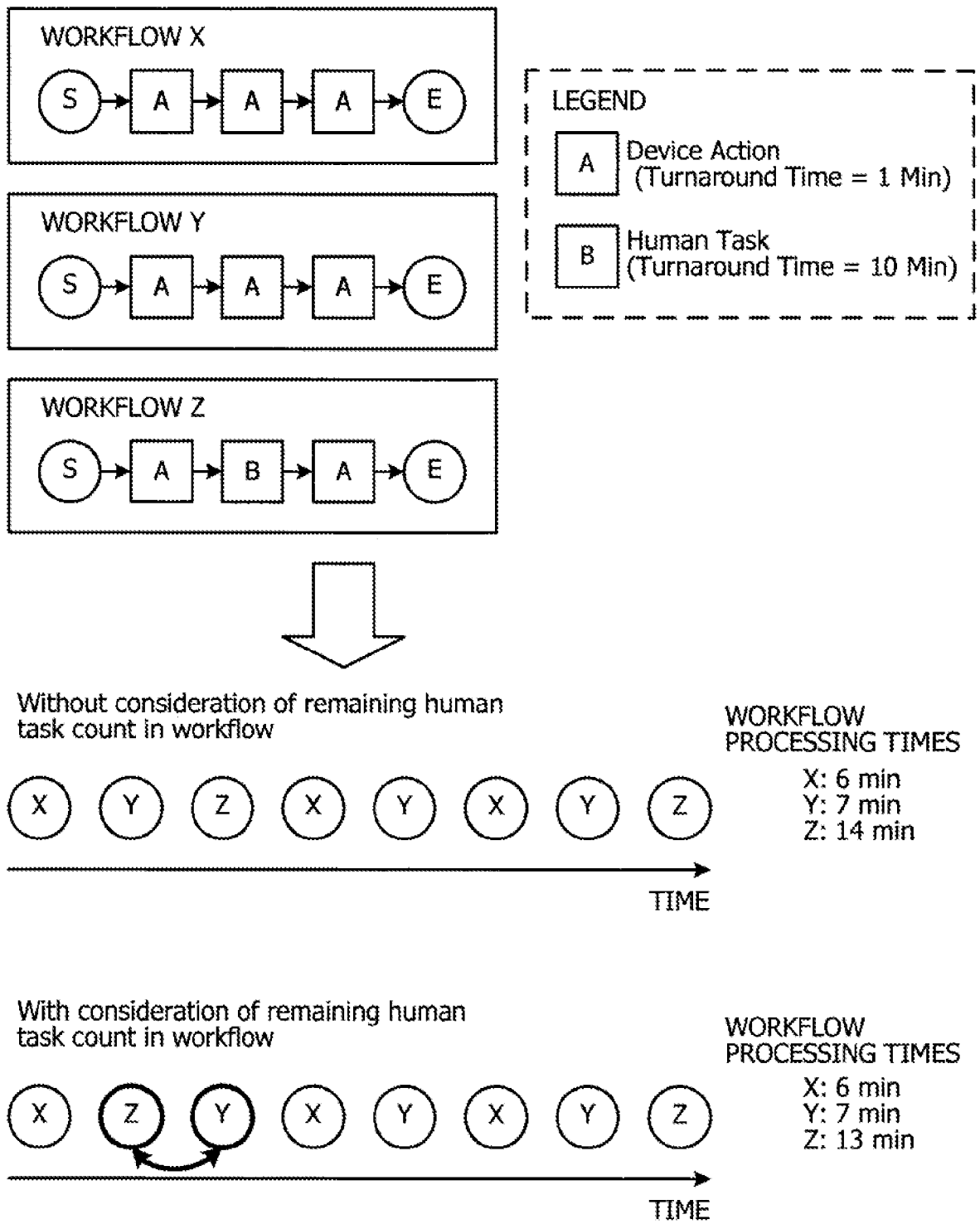
FIG. 33 illustrates an example of parallel workflows.

FIG. 33 illustrates an example of parallel workflows. It is assumed in this example that each task of automatically executable device actions takes one minute, and that each human task takes ten minutes. Suppose now that the target device (not illustrated) allows one connection at the most. The communication with the target device is thus handled by a single thread, which sequentially executes three workflows X, Y, and Z. This means that the communication thread executes communication requests from the three workflows one at a time, during which other communication requests stay in the queue. That is, there are always pending requests in this case. As will be discussed below, the processing time of a workflow may vary depending on whether or not its remaining human task count is taken into consideration.

Take workflow X, for example. When this workflow X is executed alone, its execution time is three minutes because workflow X includes three device actions each taking one minute to execute.

When workflows X, Y, and Z are executed together, their device actions are sequentially processed in the order that they are delegated to the single communication thread. Specifically, the second device action of workflow X is executed two minutes after the first device action because device actions of workflows Y and Z are executed in between the noted operations of workflow X. The total processing time of workflow X thus amounts to six minutes. Likewise, the total processing time of workflow Y amounts to seven minutes.

The next section will discuss the processing time of workflow X in the case where workflows are executed without consideration of their remaining human task counts.

FIG. 34 illustrates difference processing times of workflows, depending on whether to consider remaining human task counts. When workflow Z is executed alone, its execution time is twelve minutes because workflow Z includes two device actions each taking one minute to execute and one human task that consumes ten minutes. When three workflows X, Y, and Z are executed together, the second device action of workflow Z issues a communication request for its device action ten minutes after the first device action of the same. This is because the human task device takes ten minutes to complete. Accordingly, the total processing time of workflow Z amounts to fourteen seconds.

In contrast to the above, the proposed execution of workflows in consideration of their remaining human task counts reduces the total processing time of workflow Z by one minute. More specifically, the first device action of workflow Z is executed in preference to the others, thus cutting one minute out of the period in which the communication thread holds it in the queue. As a result, the total processing time of workflow Z is reduced to thirteen minutes.

As can be seen from the above example, workflow Z stays in pending state for a reduced time because the communication thread considers the presence of a human task and thus raises its priority.

The second embodiment allows the communication daemon to use at least part of priority data of the root workflow in place of priority data of sub-workflows. This feature prevents the root workflow from being delayed even if its sub-workflows have a low priority.

FIG. 35 illustrates priority control of sub-workflows. Workflow X seen in FIG. 35 has a significance of "High." Workflow X makes an asynchronous call for sub-workflow Y, whose significance is "Low." There is also a stand-alone workflow Z, whose significance is "Middle."

Without inheriting the significance of its parent workflow X, the asynchronous sub-workflow Y would be dequeued according to its own priority, meaning that other workflow Z would be processed in preference to sub-workflow Y. This could lead to delayed completion of sub-workflow Y.

The second embodiment, on the other hand, permits asynchronous sub-workflow Y to inherit the significance of its parent workflow X, thus raising the effective significance of sub-workflow Y to "High." This feature prevents delayed completion of sub-workflow Y, because it is treated as part of the significant workflow X.

The second embodiment also permits synchronous sub-workflows to inherit significance from the root workflow. In other words, the priority determination process equally treats the root workflow and synchronous sub-workflows. This feature prevents the root workflow with a high priority from delaying even if some erroneous setup is made to sub-workflows.

The second embodiment and its advantages have been described above. The next section will add some notes about possible variations.

(g) Other Embodiments

The foregoing second embodiment uses significance, target completion date and time, remaining human task count, and start date and time as the parameters for priority determination. It is, however, not intended to limit the scope of the embodiments by these parameters. For example, it is possible to implement the proposed techniques using, not all, but some of these parameters.

The second embodiment has also discussed the order of priority-determining parameters. That is, the significance is evaluated in the first place, followed by target completion date and time, remaining human task count, and start date and time in that order. A later parameter is evaluated only when the preceding parameters do not distinguish between workflows. It is, however, not intended to limit the scope of the embodiments by the above order of parameters. In other words, the order of parameters may be modified.

Several embodiments and their variations have been described above. In one aspect of those embodiments and variations, the proposed techniques enable more efficient execution of workflows.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a program, wherein the program causes a computer to perform a process comprising:
   determining human task counts each representing a number of human tasks in individual workflows, the workflows each defining a procedure of tasks to be performed on a computer device under management, the tasks including human tasks to be performed by humans and automated tasks to be executed automatically with remote control by the computer via a network;
   determining priorities of the workflows, based on the human task counts determined therefor, for prioritized use of one or more connections that are established to communicate with the computer device under management in order to perform automated tasks thereon, the one or more connections being respectively established by one or more threads being in one-to-one correspondence with the one or more connections;
   executing, in order of priority of the workflows, the automated tasks of the workflows on the computer device with the remote control using the one or more connections by the one or more threads;
   setting a thread to a status of inactive, upon detecting that no unexecuted automated tasks to be executed by the thread exists;
   comparing a number of existing connections to the device with a number of workflows including automated tasks to be performed on the device; and
   stopping as many connections as a difference between the number of existing connections and the number of workflows, upon determining that the number of existing connections is larger than the number of workflows, the many connections to be stopped being established by threads having the status of inactive among the one or more threads,
   wherein the determining of human task counts includes:
   identifying all possible paths in a specific workflow which includes at least one conditional branch which causes the possible paths, from a currently executed task to an end point of the specific workflow;
   calculating a number of human tasks with respect to each of the possible paths; and
   extracting a largest one of the calculated numbers as a human task count of the specific workflow.

2. The non-transitory computer-readable storage medium according to claim 1, wherein the determining of human task counts includes:
   determining a human task count in a specific workflow by counting unexecuted human tasks in that specific workflow.

3. The non-transitory computer-readable storage medium according to claim 1, wherein the determining of priorities includes:
   raising priority of a workflow that has a larger human task count than other workflows.

4. The non-transitory computer-readable storage medium according to claim 1, wherein:
   the workflows include a sub-workflow called up by a calling workflow; and
   the process includes determining priority of the calling workflow and applying the determined priority of the calling workflow to the sub-workflow.

5. The non-transitory computer-readable storage medium according to claim 1, wherein:
   the workflows include a sub-workflow called up by a calling workflow using either a synchronous call or an asynchronous call, the synchronous call causing the calling workflow to wait for completion of the sub-workflow before proceeding to subsequent tasks, the asynchronous call permitting the calling workflow to proceed to subsequent tasks without waiting for completion of the sub-workflow; and
   the process further includes:
   determining priority of the calling workflow and applying the determined priority of the calling workflow to the sub-workflow, when the synchronous call is used to call up the sub-workflow, and
   determining priority of the sub-workflow, based on a human task count determined for the sub-workflow, when the asynchronous call is used to call up the sub-workflow.

6. The non-transitory computer-readable storage medium according to claim 1, wherein the automated tasks within a workflow are not counted, and the number of human tasks in the individual workflow is less than a total number of tasks in the individual workflow.

7. A connection management method comprising:
   determining human task counts each representing a number of human tasks in individual workflows, the workflows each defining a procedure of tasks to be performed on a computer device under management, the tasks including human tasks to be performed by humans and automated tasks to be executed automatically with remote control by the computer via a network;
   determining, by a processor, priorities of the workflows, based on the human task counts determined therefor, for prioritized use of one or more connections that are established to communicate with the computer device under management in order to perform automated tasks thereon, the one or more connections being respectively established by one or more threads being in one-to-one correspondence with the one or more connections;
   executing, by the processor, in order of priority of the workflows, the automated tasks of the workflows on the computer device with the remote control using the one or more connections by the one or more threads;
   setting, by the processor, a thread to a status of inactive, upon detecting that no unexecuted automated tasks to be executed by the thread exists;
   comparing, by the processor, a number of existing connections to the device with a number of workflows including automated tasks to be performed on the device; and
   stopping, by the processor, as many connections as a difference between the number of existing connections and the number of workflows, upon determining that the number of existing connections is larger than the number of workflows, the many connections to be stopped being established by threads having the status of inactive among the one or more threads,
   wherein the determining of human task counts includes:
   identifying all possible paths in a specific workflow which includes at least one conditional branch which causes the possible paths, from a currently executed task to an end point of the specific workflow;
   calculating a number of human tasks with respect to each of the possible paths; and
   extracting a largest one of the calculated numbers as a human task count of the specific workflow.

8. An information processing apparatus comprising:
a memory configured to store therein data of workflows each defining a procedure of tasks to be performed on a computer device under management, the tasks including human tasks to be performed by humans and automated tasks to be executed automatically with remote control by the computer via a network; and
a processor configured to perform a process including:
determining human task counts each representing a number of human tasks in the individual workflows; and
determining priorities of the workflows, based on the human task counts determined therefor, for prioritized use of one or more connections that are established to communicate with the computer device under management in order to perform automated tasks thereon, the one or more connections being respectively established by one or more threads being in one-to-one correspondence with the one or more connections;
executing, in order of priority of the workflows, the automated tasks of the workflows on the computer device with the remote control using the one or more connections by the one or more threads;
setting a thread to a status of inactive, upon detecting that no unexecuted automated tasks to be executed by the thread exists;
comparing a number of existing connections to the device with a number of workflows including automated tasks to be performed on the device; and
stopping as many connections as a difference between the number of existing connections and the number of workflows, upon determining that the number of existing connections is larger than the number of workflows, the many connections to be stopped being established by threads having the status of inactive among the one or more threads,
wherein the determining of human task counts includes:
identifying all possible paths in a specific workflow which includes at least one conditional branch which causes the possible paths, from a currently executed task to an end point of the specific workflow;
calculating a number of human tasks with respect to each of the possible paths; and
extracting a largest one of the calculated numbers as a human task count of the specific workflow.

* * * * *